United States Patent
Jain et al.

(10) Patent No.: US 6,278,926 B1
(45) Date of Patent: Aug. 21, 2001

(54) ADAPTIVE ELECTRONIC TRANSMISSION CONTROL SYSTEM AND STRATEGY FOR NONSYNCHRONOUS AUTOMATIC TRANSMISSION

(75) Inventors: Pramod K. Jain; Howard Cecil Kuhn, both of Farmington Hills; Ronald James Vodicka, West Bloomfield, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/665,353

(22) Filed: Sep. 18, 2000

(51) Int. Cl.[7] ............................. F16H 61/30; B60K 41/04
(52) U.S. Cl. ............................. 701/58; 477/53; 477/655; 477/52; 192/3.25; 192/3.58; 475/127; 475/296
(58) Field of Search ....................... 701/58, 51; 192/3.3, 192/3.25; 477/62

(56) References Cited

U.S. PATENT DOCUMENTS

| | | |
|---|---|---|
| 4,509,389 | 4/1985 | Vahratian et al. . |
| 5,081,886 | 1/1992 | Person et al. . |
| 5,150,297 | 9/1992 | Daubenmier et al. . |
| 5,157,608 | 10/1992 | Sankpal et al. . |
| 5,303,616 | 4/1994 | Palansky . |
| 5,305,663 | 4/1994 | Leonard et al. . |
| 5,383,825 | 1/1995 | El-Khoury et al. . |
| 5,460,582 | 10/1995 | Palansky et al. . |
| 5,474,506 | 12/1995 | Palansky et al. . |
| 5,553,694 | * 9/1996 | Schulz et al. ......................... 192/3.3 |
| 5,586,029 | * 12/1996 | Schulz et al. ......................... 701/51 |
| 5,646,842 | * 7/1997 | Schulz et al. ......................... 701/51 |
| 5,722,519 | 3/1998 | Kirchhoffer et al. . |
| 5,758,302 | * 5/1998 | Schulz et al. ......................... 701/51 |
| 5,809,442 | 9/1998 | Schulz et al. . |
| 5,835,875 | 11/1998 | Kirchhoffer et al. . |

* cited by examiner

Primary Examiner—William A. Cuchlinski, Jr.
Assistant Examiner—Tuan C To
(74) Attorney, Agent, or Firm—Frank G. McKenzie

(57) ABSTRACT

An adaptive electronic transmission control for an automatic transmission having multiple-ratio gearing establishing plural torque flow paths between a torque input member and a driven member, the relative motion of the elements of the gearing being controlled by a friction torque establishing member and an overrunning coupling connection between two gear elements of the gearing. A ratio shift is achieved by establishing a driving connection between a selected gearing element and a torque delivery shaft. The shift is achieved by controlling the capacity of the friction element using a fluid pressure actuator. Shift quality is optimized by establishing a bias pressure on a friction element accumulator and by using a feedback control system to control the rate of change of transmission ratio during the shift.

12 Claims, 13 Drawing Sheets

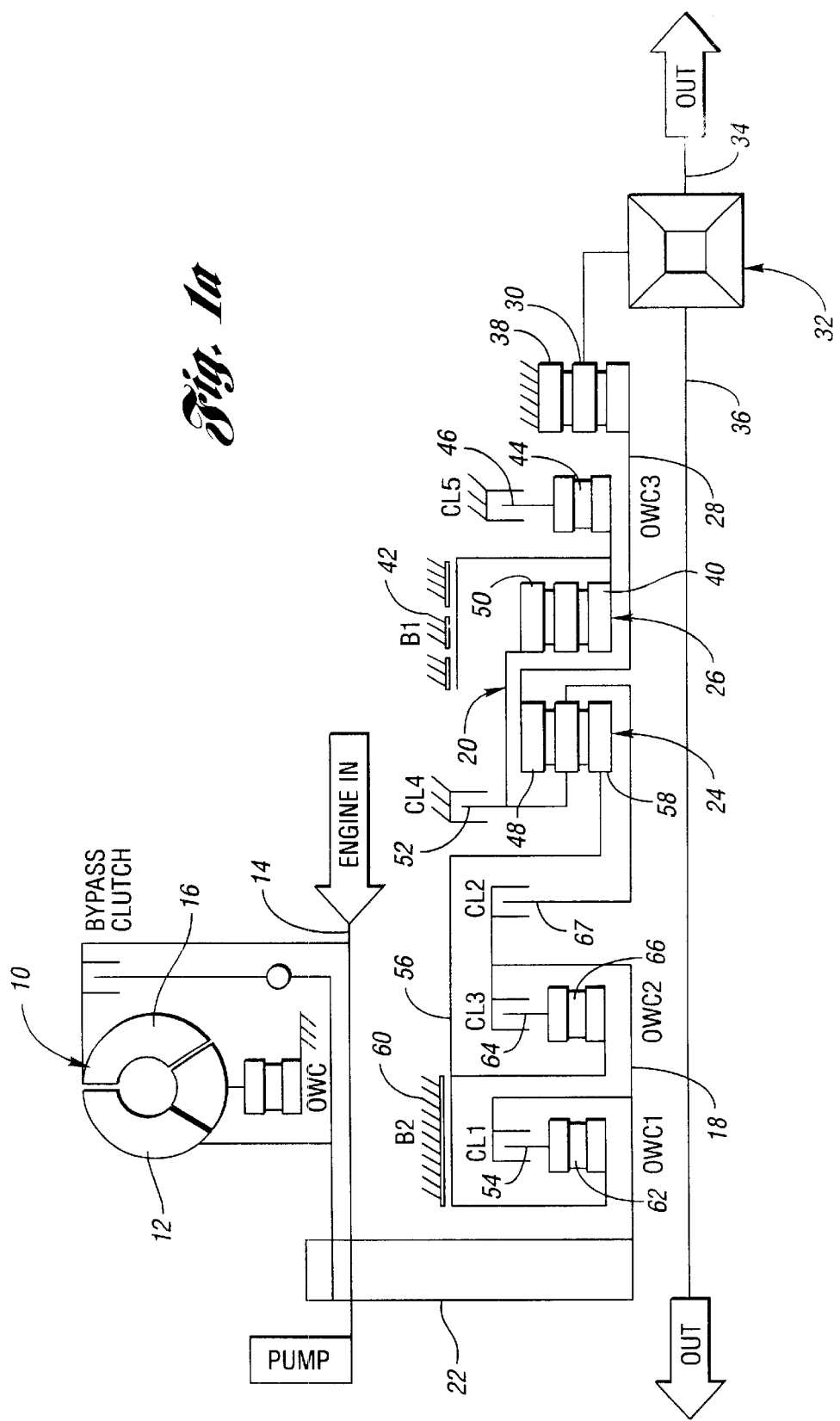

ELEMENT APPLICATION CHART

| GEAR | B1 | B2 | CL1 | CL2 | CL3 | CL4 | CL5 | OWC1 | OWC2 | OWC3 | COAST BRAKE |
|---|---|---|---|---|---|---|---|---|---|---|---|
| 1M | X | | X | | | | | X | | X | YES |
| 2M | X | | X | X | | | X | O/R | | X | YES |
| 1st | | | X | | | | X | X | | X | NO |
| 2nd | | | X | X | X | | X | O/R | | X | NO |
| 3rd | | | | X | X | | X | | X | O/R | NO |
| 4th | | X | | X | X | X | X | | O/R | O/R | YES |
| REV | | | X | X | | | | X | | | NO |

| | FRICTION ELEMENT APPLICATION CHART | | | | | | | | OWC APPLICATION CHART | | |
|---|---|---|---|---|---|---|---|---|---|---|---|
| GEAR | CST | INT | HIGH | FOR | L/R | O/D | BAND1 | | OWC 1 | OWC 2 | OWC 3 |
| 1M | X | | | X | X | | | | X | | X |
| 2M | | | | X | X | X | | | O/R | | X |
| 3M | X | X | X | X | | | X | | X | X | O/R |
| 4M | X | X | X | X | | | | | X | O/R | O/R |
| | | | | | | | | | | | |
| 1 | | | | X | | | | | X | | X |
| 2 | | * | X | X | | X | | | O/R | | X |
| 3 | | X | X | X | | | | | X | X | O/R |
| 4 | | X | X | X | | | | | X | O/R | O/R |
| 5 | | X | X | X | | X | | | O/R | O/R | O/R |
| REV | X | | X | | X | | | | X | | |

*Fig. 2b*

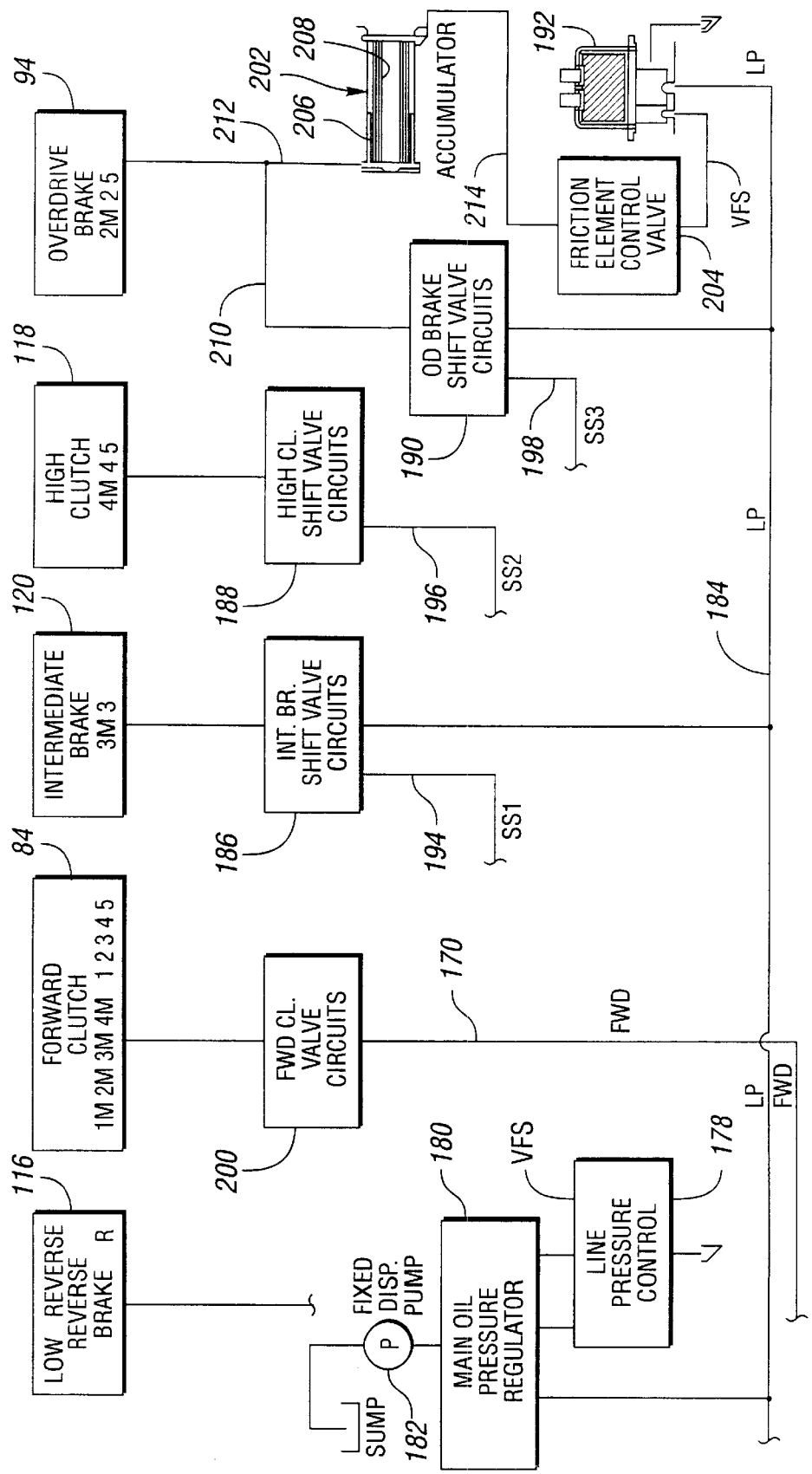

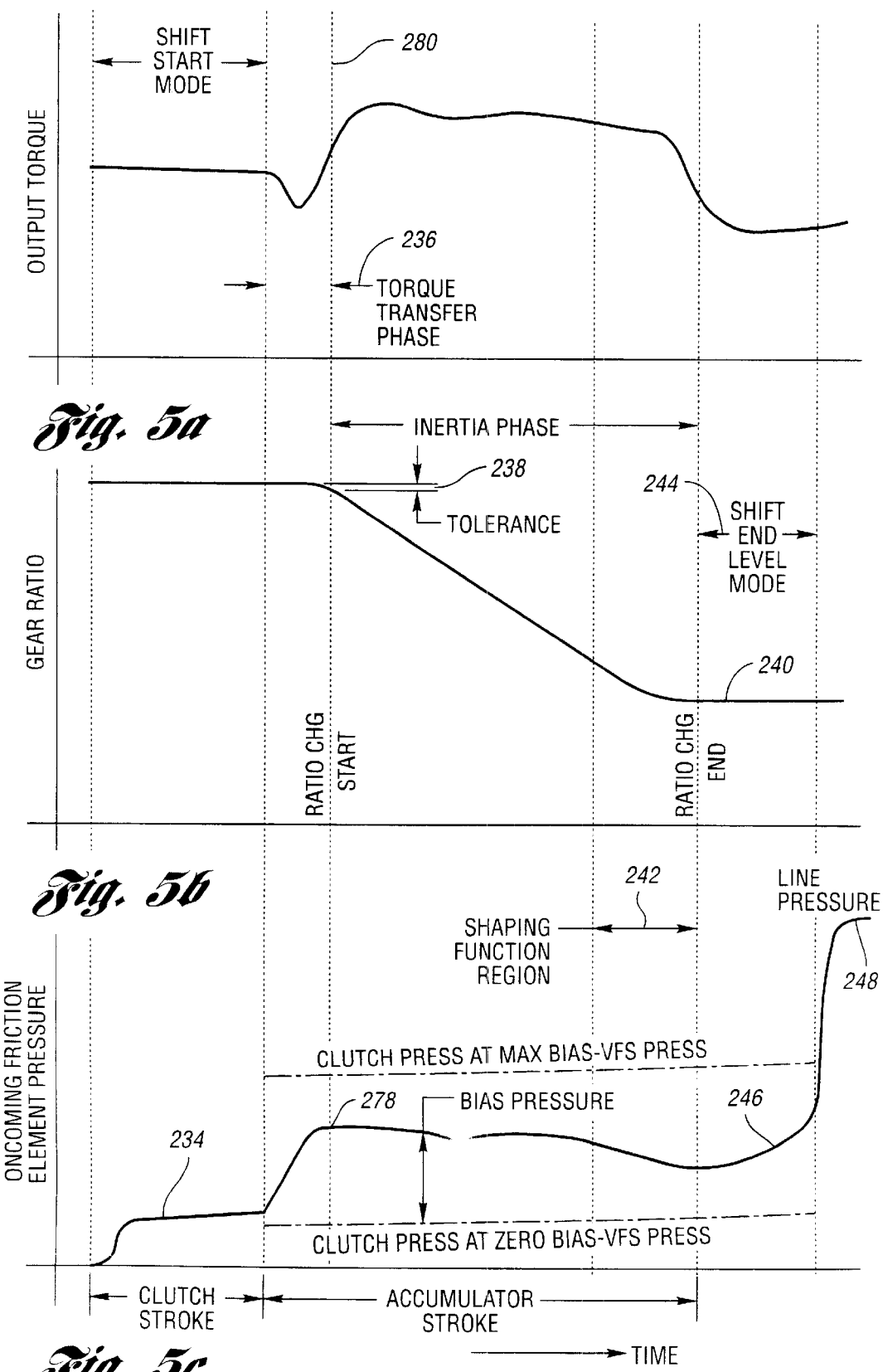

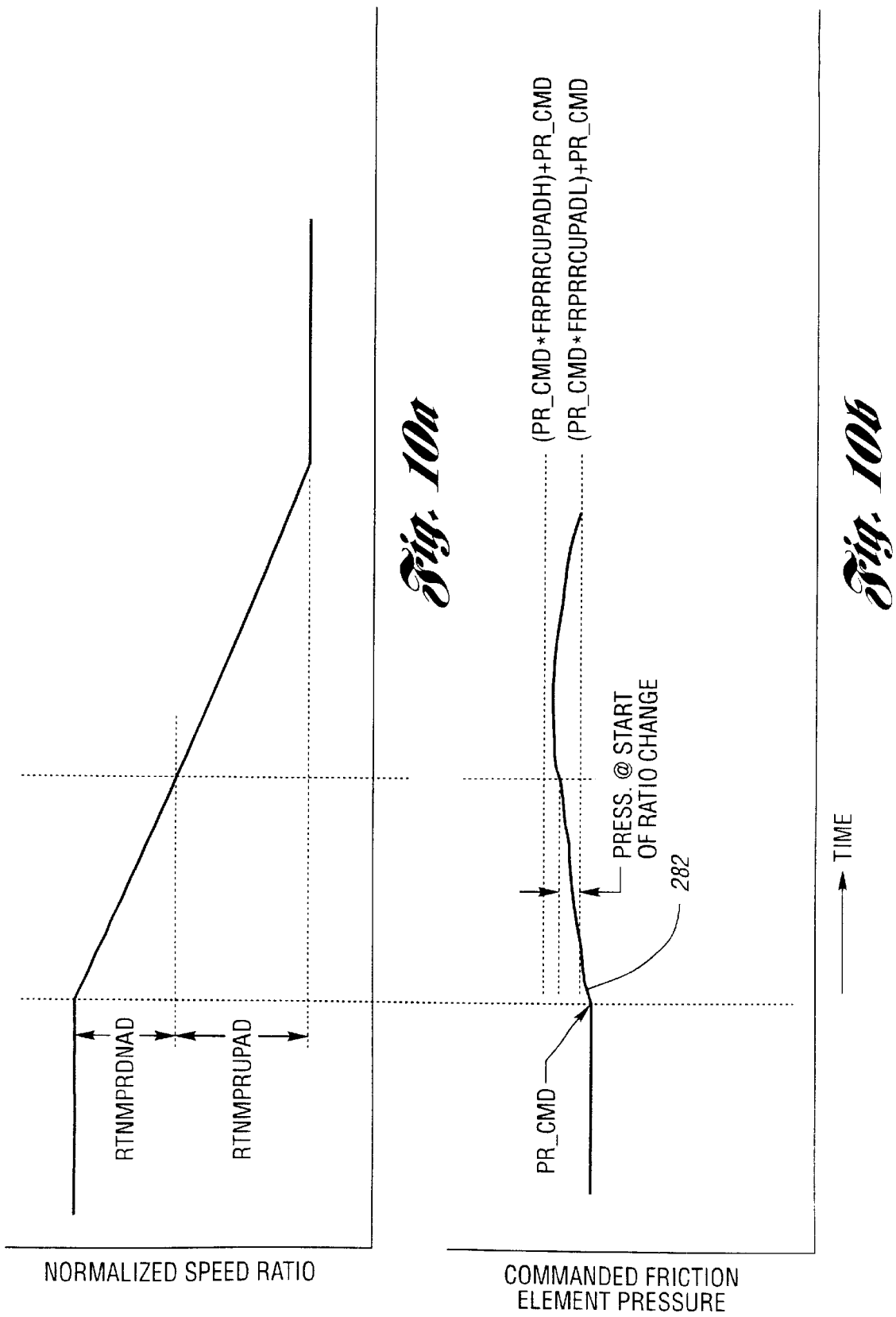

ADAPTIVE ELECTRONIC TRANSMISSION CONTROL SYSTEM AND STRATEGY FOR NONSYNCHRONOUS AUTOMATIC TRANSMISSION

TECHNICAL FIELD

The invention relates to multiple-ratio automatic transmissions for automotive vehicles and a control system for optimizing and maintaining shift quality.

BACKGROUND ART

Automatic transmissions for automotive vehicles of contemporary design typically include multiple-ratio gearing having torque input gear elements connected drivably to an internal combustion engine through a hydrokinetic torque converter. A driven element of the gearing is drivably connected to a differential axle assembly for vehicle traction wheels. Relative motion of the elements of the gearing is controlled by clutches and brakes that establish plural torque flow paths through the gearing, each torque flow path being associated with a discrete torque ratio.

Ratio changes during forward-drive operation of the vehicle are achieved by engaging and disengaging a friction element, which may be a friction clutch or a friction brake, in the torque flow path. Further, overrunning couplings may cooperate with the friction element during a speed ratio change. As a friction element is engaged, an overrunning coupling is released. When the friction element is disengaged, the overrunning coupling element establishes a mechanical torque flow path through associated gearing elements.

An example of a known multiple-ratio automotive transmission mechanism in an automotive vehicle powertrain may be seen by referring to U.S. Pat. Nos. 5,150,297, 5,081,886, 4,509,389, 5,303,616, 5,474,506 and 5,383,825, each of which is assigned to the assignee of the present invention.

The lowest speed ratio in a transmission of the kind disclosed in the foregoing patents includes an overrunning coupling that serves as a torque reaction brake during operation in the lowest speed ratio. A nonsynchronous upshift to the second lowest speed ratio is achieved by engaging a friction clutch, thereby establishing a nonsynchronous 1–2 upshift. Nonsynchronous ratio changes from the second ratio to the third ratio and from the third ratio to the fourth ratio also are achieved by selectively engaging friction clutches as the state of a companion overrunning coupling changes from a torque delivery mode to an overrunning mode. Such shifts commonly are referred to as nonsynchronous shifts since only a single friction element is involved in the ratio change. The other coupling, which may either be an overrunning brake or an overrunning clutch, need not be disengaged nor released in synchronism with the application or a release of the friction element because the overrunning coupling freewheels the instant the torque flow path through the overrunning coupling is interrupted during a ratio change.

Another example of a known transmission system capable of being used in an automotive vehicle driveline includes a compound planetary gear unit in combination with a simple planetary gear unit, the compound planetary gear unit having three forward-driving ratios. When the simple planetary gear unit is combined with the compound planetary gear unit, either one or two additional ratios are obtained. An example of a transmission of this type can be seen by referring to U.S. Pat. Nos. 5,758,302, 5,586,029 and 5,722, 519. These patents, as in the case of the previously described prior art patents, are owned by the assignee of the present invention.

The gearing systems of the '302, '029 and '519 patents have a friction brake and a friction clutch for controlling the relative motion of the elements of the simple planetary gear unit. An overrunning coupling establishes and disestablishes a driving connection between the elements of the simple planetary gear unit. A nonsynchronous 1–2 upshift is achieved as the friction brake is applied and the companion overrunning coupling freewheels. As in the case of the transmission previously described, this 1–2 upshift is a nonsynchronous upshift.

The control systems for such contemporary transmissions are designed initially for the best possible shift quality. They are not capable, however, of accommodating unit variations in the clutch and brake actuators. Neither are they capable of accommodating system characteristic changes during the life of the transmission as the friction elements are subjected to wear.

DISCLOSURE OF INVENTION

The electronic, adaptive, transmission control system of the invention, unlike control systems of the kind described in the U.S. patents discussed in the preceding section, includes a hydraulic circuit with a hydraulic accumulator controller and an adaptive shift quality control strategy, which maintain consistent shift quality to accommodate unit-to-unit variations in the transmission system. It accommodates also changes in the dynamic characteristics of the friction elements of the transmission throughout the life of the transmission.

Shift quality is achieved by controlling the pressure on the spring side of a hydraulic accumulator for the oncoming friction element. The pressure applied to the accumulator is referred to in this description as bias pressure. It is developed by a variable-force solenoid.

The system may include two variable-force solenoids, which provide independent pressure control of both the static and the dynamic capacity of the separate friction elements. During a speed ratio change, a feedback control system is used to control ratio change rate. The shape of the gear ratio change rate profile during the shift is optimized to maintain maximum shift quality.

The transmission controller includes pressure control solenoids that are under the control of a microprocessor that receives powertrain variables at its signal input conditioning portion, including engine control signals and driver activated signals.

An appropriate ratio shift strategy is calibrated initially and is maintained in the ROM portion of the microprocessor memory. The initial powertrain characteristics then depend initially on the initial calibration.

Shift quality consistency is maintained during operation of the powertrain by adapting the commanded clutch pressure and then determining a clutch accumulator bias pressure. At the end of the shift, the adaptive clutch pressure is computed based on linearly extrapolated ratio change time, the time from the start of the shift to the start of the ratio change mode and the initial rate of pressure change. The overall algorithm thus is modified by learned powertrain variables as an adaptive strategy is developed and stored in a keep-alive memory (KAM) portion of the microprocessor.

The microprocessor is a digital micro-controller that receives input continuously from sensors and stores and executes control logic. The logic is modified during continued use of the powertrain as output signals for transmission line pressure control and for accumulator bias pressure control are developed on a real-time basis. Engine speed, turbine speed and output shaft speed are determined from appropriate sensors located in the powertrain hardware. Other inputs are throttle position, manual driver range selector lever position, brake on/off switch state, air conditioner on/off signals, and a transmission temperature signal.

The oncoming friction element pressure, during a shift, is based on control logic. The information that is learned from the input signals on a real-time basis is used to calculate pressures. Digital signals from the microprocessor control electronic driver circuits, which convert the digital signals to electrical current for variable-force solenoids. The solenoids, in turn, control the flow of oil to the friction element actuators based on the input signals. The static and dynamic pressures developed by the solenoids achieves optimum shift quality.

BRIEF DESCRIPTION OF DRAWINGS

FIG. 1a is a schematic diagram of a multiple-ratio automatic transmission capable of embodying the improved adaptive transmission control of the invention;

FIG. 1b is a chart showing the friction element engagement and release pattern for the transmission schematically shown in FIG. 1a;

FIG. 2a is another multiple-ratio transmission for automotive vehicles employing an alternate gearset wherein torque flow paths are established by a simple planetary gear unit located between the hydrokinetic torque converter and by a multiple-ratio gear unit, the ratio change from the lowest ratio to the second forward-driving ratio being characterized by a nonsynchronous ratio change;

FIG. 2b is a chart showing the friction element engagement-and-release pattern as the five forward-driving ratios and a single reverse ratio for the transmission of FIG. 2a are achieved;

FIG. 2d is a schematic representation of a portion of the hydraulic control valve circuit for activating and releasing the friction elements of the transmission schematically shown in FIG. 2b;

FIG. 5a is a plot of output torque versus time, which illustrates the upshift logic for the friction element involved in an upshift of a transmission such as the transmission of FIG. 1a or the transmission of FIG. 2a;

FIG. 5b is a plot of gear ratio versus shift time during an upshift for the transmission of FIG. 1a or the transmission of FIG. 2a;

FIG. 5c is a plot showing the oncoming friction element pressure during an upshift corresponding to the output torque and the gear ratio shown in FIGS. 5a and 5b;

FIG. 6b is a plot of the gear ratio during the shift interval corresponding to the downshift of FIG. 6a;

FIG. 7b is a plot showing linearly extrapolated ratio change time for the speed ratio information illustrated in FIG. 7a;

FIG. 10a is a plot of normalized speed ratio during a shift interval when an upshift is commanded; and FIG. 10b is a plot of commanded pressure for the oncoming friction element during an upshift.

BEST MODE FOR CARRYING OUT THE INVENTION

Figures 1B, 2A:
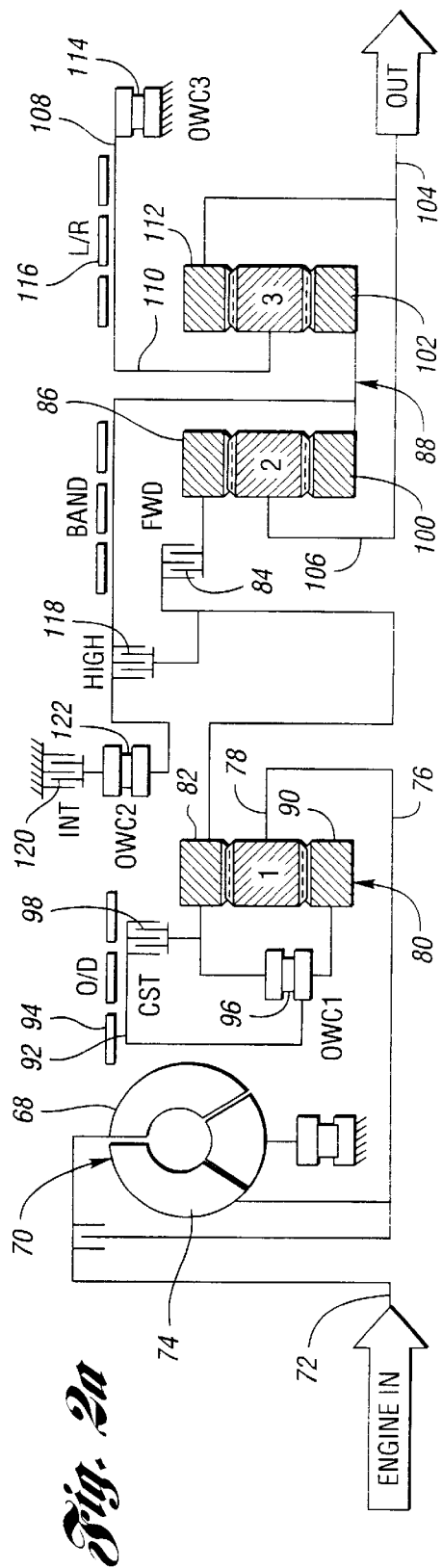

FIGS. 1a and 2a show two examples of a multiple-ratio transmission wherein nonsynchronous ratio shifts may be accomplished using the control system and strategy of the present invention. The trans mission of FIG. 1a is described in U.S. Pat. Nos. 5,150,297, 5,081,886, 4,509,389, 5,303, 616, 5,474,506 and 5,383,825. These patents are owned by the assignee of the present invention.

The transmission of FIG. 2a is described in U.S. Pat. Nos. 5,758,302, 5,586,029, and 5,722,519. These prior art patents likewise are assigned to the assignee of the present invention.

The transmission of FIG. 1a comprises a hydrokinetic torque converter 10 having an impeller 16 connected to a torque input shaft 14, which is connected to an internal combustion engine crankshaft. A bladed turbine 12 of the torque converter 10 is connected to a torque input shaft 18 for multiple-ratio gearing 20. The connection between the turbine 12 and the torque input shaft 18 is defined in part by drive chain 22.

Gear unit 20 comprises a first simple planetary gear unit 24 and a second simple planetary gear unit 26. The torque output shaft for the gearing 20, shown at 28, is connected by a final drive planetary gear unit 30 to the torque input side of differential gear unit 32. Torque output half-shafts 34 and 36 distribute torque from bevel side gears of the differential gear unit 32 to the vehicle traction wheels.

The ring gear for the planetary gear unit 30 is anchored to the transmission housing, as shown at 38. The sun gear 40 of the gear unit 26 is connected to a brake drum for friction brake band 42, thereby providing a torque reaction point during low speed ratio operation and second speed ratio operation with coast torque capability. An overrunning coupling 44 connects sun gear 26 to the transmission housing through a selectively engageable friction brake 46.

The planetary carrier for gear unit 26 is connected to driven shaft 28 and to ring gear 48 for gear unit 24. Ring gear 50 for gear unit 26 and the carrier for gear unit 24 are anchored to the transmission housing through selectively engageable friction brake 52 during reverse drive.

Friction clutch 54 is engaged during first and second speed ratio operation as torque is delivered from shaft 18 to torque transfer drum 56. Sun gear 58 of gear unit 24 is connected directly to the drum 56. Brake band 60 anchors drum 56 and sun gear 58 during fourth speed ratio operation, which is an overdrive ratio. Overrunning coupling 62 is in series relationship with respect to the clutch 54 as torque is transmitted from shaft 18 to the sun gear 58.

Friction clutch 67, which is in series with overrunning coupling 66, establishes a driving connection between shaft 18 and the drum 56 during third speed ratio operation and fourth speed ratio operation, as well as during manual low speed ratio operation in which coasting torque is available with the transmission in the lowest ratio.

Friction clutch 66 selectively connects shaft 18 to the carrier for gear unit 24 during operation in the second, third and fourth forward-driving ratios.

The transmission of FIG. 1a is capable of achieving two forward-driving, nonsynchronous upshifts and downshifts. Reference may be made to the clutch engagement and release chart of FIG. 1b for an explanation of the engagement and release pattern during ratio changes.

During each of the forward-driving ratios, clutch 46 (CL5) is applied, but it is released during reverse drive operation. During first speed ratio operation, clutch 54 (CL1) is applied and the overrunning coupling 62 (OWC1) engages. Torque from shaft 18 is transferred directly to sun gear 58 of the gear unit 24 as reaction torque is transferred through the overrunning coupling 44 and the engaged friction element 46.

A ratio change from the first ratio to the second ratio is obtained merely by applying a single friction element, i.e., clutch 67 (CL2). At that time, overrunning coupling 62 (OWC1) freewheels. Thus, the shift from the lowest ratio to the second ratio is a nonsynchronous shift. There is a single oncoming friction element.

A nonsynchronous 2–3 upshift occurs as clutch 64 is applied, causing overrunning coupling 44 to freewheel.

Fourth speed ratio is obtained by applying brake 60 (B2). This anchors sun gear 58 as torque is delivered through the engaged clutch 67 (CL2) to the carrier for gear unit 24. This overdrives the ring gear 48 and the output shaft 28. Again, a single oncoming friction element (B2) is applied to achieve the nonsynchronous upshift (a 3–4 upshift) as the overrunning coupling 66 freewheels.

In the transmission embodiment of FIG. 2a, engine torque is delivered to the impeller 68 of hydrokinetic torque converter 70 through torque input member 72. The turbine 74 of the torque converter 68 drives turbine shaft 76, which is connected to the carrier 78 of a simple planetary gear unit 80. The ring gear 82 of the simple planetary gear unit 80 is connected through a forward-drive friction clutch 84 to the ring gear 86 of a Simpson-type gearset 88. Sun gear 90 of simple planetary gear unit 80 is connected to drum 92 of an overdrive friction brake 94 (OD). Overrunning coupling 96 connects the sun gear 90 to the ring gear 82 of the gear unit 80 when the brake 94 is not applied. Coupling 96 overruns at that time. Coast torque may be transmitted through simple planetary gear unit 80 by engaging coast torque friction clutch 98 (CST).

The Simpson gearset 88 includes a common sun gear, shown at 100 and 102. The carrier 106 for one of the gear units of the gear set 88 is connected to the driven shaft 104. The other carrier 110 for the gearset 88 is connected to brake drum 108. Ring gear 112 of the gearset 88 is connected drivably to output shaft 104.

Brake drum 108 is anchored to the transmission housing through overrunning coupling 114 (OWC3) during operation in the first and second forward-driving ratios. Brake band 116 can be applied during first and second gear ratio operation if coast-braking is desired. Brake 116 is applied also to effect reverse drive.

High speed ratio operation is obtained by applying high clutch 118, which connects drivably ring gear 82 to the common sun gears 102 and 104 of gearset 88. Both clutches 118 and 84 are applied simultaneously during fourth speed ratio operation and during fifth speed ratio operation.

Intermediate brake 120 provides a reaction point for the common sun gears 100 and 102 when the transmission operates in the third ratio. At that time, torque is transmitted to the transmission housing through overrunning coupling 122, thereby effecting third speed ratio operation.

The ratio change from the fourth ratio to the fifth ratio involves engagement of a single oncoming friction element; namely, friction brake 94. The overrunning coupling 96 (OWC1), which was locked and which transmitted torque during fourth speed ratio operation, overruns during fifth speed ratio operation. Thus, the shift from the fourth ratio to the fifth ratio is a nonsynchronous shift.

Reference may be made to FIG. 2b for a complete understanding of the clutch and brake engagement and release pattern for the transmission of FIG. 2a.

Although the invention may be practiced using a transmission of the kind shown in FIG. 1a as well as the transmission shown in FIG. 2a, the invention will be described herein with reference only to the transmission of FIG. 2a.

The reference patents that are identified in the preceding discussion may be referred to in order to supplement the present description. They are incorporated herein by reference.

Figure 2C:
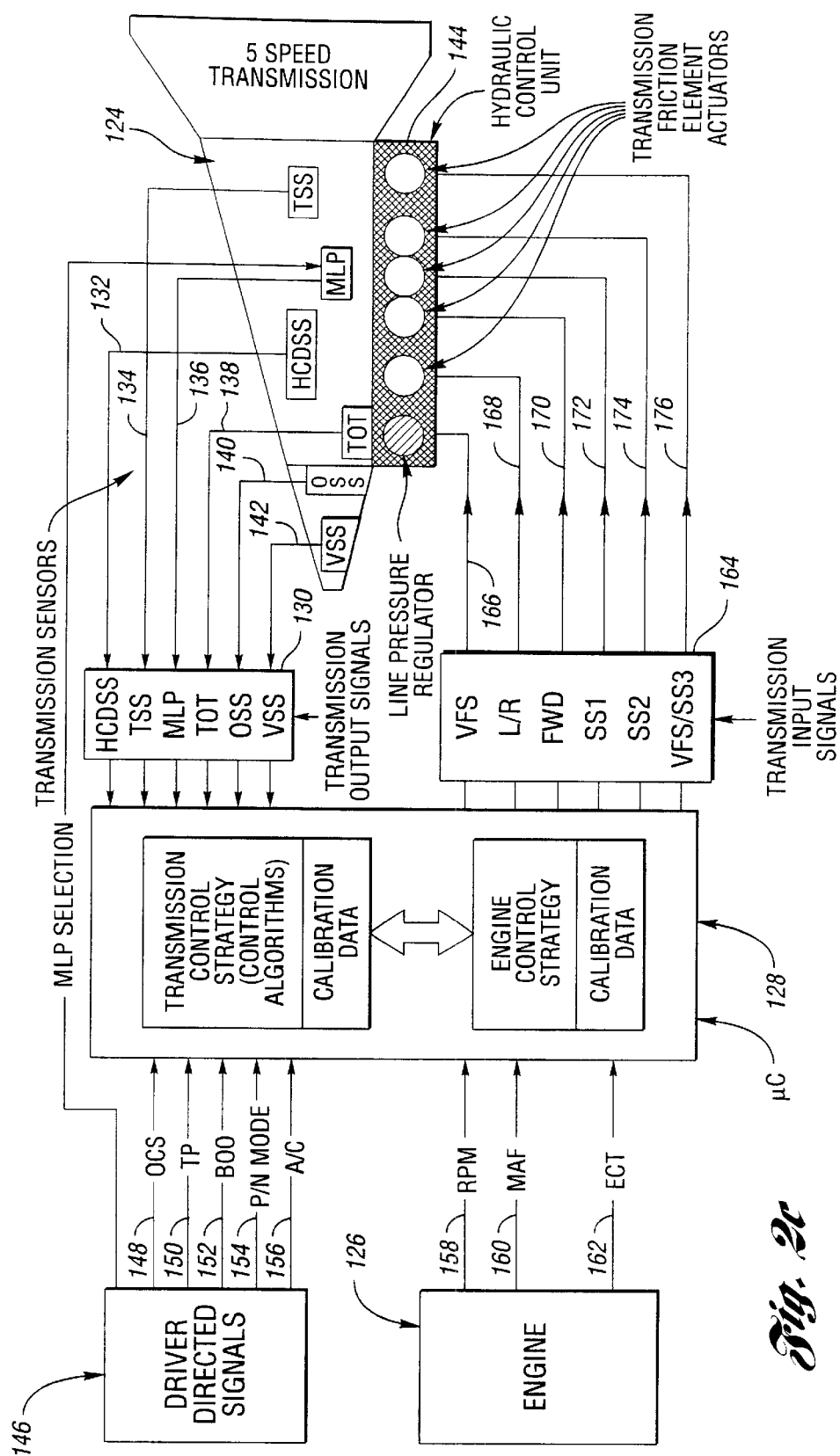
FIG. 2c is a schematic representation of the overall powertrain, which includes the transmission control system and control strategy of the invention.

FIG. 2c is a schematic representation, in block diagram form, of the overall powertrain. The transmission of FIG. 2a is shown at 124. The engine is shown at 126. The powertrain controller, which may be a central powertrain digital microcomputer, is shown at 128. It is used for execution of both engine control strategy and transmission control strategy, although the present description will be concerned only with transmission control strategy.

Transmission sensors are used to develop signals for the digital computer 128. The driveline signals are designated in FIG. 2 as HCDSS, which is a high clutch drum speed sensor, a turbine speed sensor signal TSS, a manual lever position signal (actual) designated as MLP, a transmission oil temperature signal TOT, an output shaft speed sensor signal OSS, and a vehicle speed sensor signal VSS. The signals are distributed, respectively, through signal flow paths 132, 134, 136, 138, 140 and 142.

The transmission has a hydraulic control unit 144, which contains transmission friction element actuators for engaging and releasing the various friction elements indicated in FIG. 2a.

The digital computer 128 receives also driver-selected signals schematically represented at 146. These signals include a manual lever position signal, which is transmitted to the transmission. The manual lever position signal sensor distributes an actual manual lever position signal back through the signal flow path 136.

Other driver-selected signals distributed to the microcomputer are an overdrive cancel switch signal 148, a throttle position signal 150, a brake on/off switch signal 152, a park-and-neutral mode signal 154, and an air conditioner unit on/off signal 156. Engine signals distributed to the microcomputer include an engine speed signal (RPM) 158, a mass air flow signal (MAF) 160, and an engine coolant temperature signal (ECT) 162.

The signals delivered from the microcomputer during the execution of the control strategy of the present invention are indicated at 164. These include a variable-force solenoid signal (VFS), a low-and-reverse brake actuator signal (L/R), a forward-drive clutch actuator signal (FWD), shift signals SS1 and SS2, a variable-force solenoid signal and shift solenoid signal (VFS/SS3) for the overdrive brake 94. These transmission input signals are distributed to the hydraulic control unit through signal flow paths 166, 168, 170, 172, 174 and 176. Signal flow path 166 distributes a variable-force solenoid signal to a line pressure control, which is shown in FIG. 2d at 178.

FIG. 2d shows in block diagram schematic form a valve circuit for the friction elements of the transmission of FIG. 2b. Line pressure control 178 distributes a signal pressure to the main oil pressure regulator 180, which regulates the pressure of fixed displacement pump 182 for the transmission 124. Regulated pressure is distributed to line pressure passage 184, which communicates with an intermediate brake shift valve circuit 186, a high clutch valve circuit 188, an overdrive brake shift valve circuit 190, and variable-force solenoid valve 192. A shift valve signal is distributed to the circuits 186, 188 and 190 through shift signal flow paths 194, 196 and 198, respectively. Forward clutch pressure in passage 170 is distributed to the forward clutch 84 through forward clutch valve circuit 200.

The output of the variable-force solenoid 192 is distributed to one side of an accumulator 202 through a friction element control valve 204 for the friction element 94. The accumulator comprises an accumulator piston 206, which is normally biased in a left-hand direction (as viewed in FIG. 2d) by an accumulator spring 208, a variable-volume accumulator chamber on the left side of the piston 206 (as viewed in FIG. 2d) communicates with pressure feed passage 210 leading to friction element 94 (OD brake) and with the pressure feed passage 212 extending to the overdrive shift valve circuit 190.

Friction element control valve 204, including a linear valve spring, is used to extend the range of the pressure variation developed by the variable-force solenoid 192. A bias pressure is distributed to the right side of the accumulator 202 through bias pressure passage 214 whereby bias pressure is available during the entire speed ratio change interval.

The microcomputer 128 receives inputs from the driveline sensors including the engine input signals and the driver-selected signals, as discussed previously, to modify the bias pressure in the accumulator 202 so that the ratio change rate during the ratio change interval will be compatible with the optimum calibrated ratio shift time. If a decrease in the ratio shift time or the ratio change rate is required to maintain the optimum value, a delta pressure value (which is a fraction of the previously commanded pressure value) will be subtracted from the previous commanded pressure for the oncoming friction element. If the friction change rate is too long, a positive delta pressure value will be added to the commanded pressure by appropriately adjusting the pressure bias at accumulator 202. This will be explained subsequently.

Figure 3:
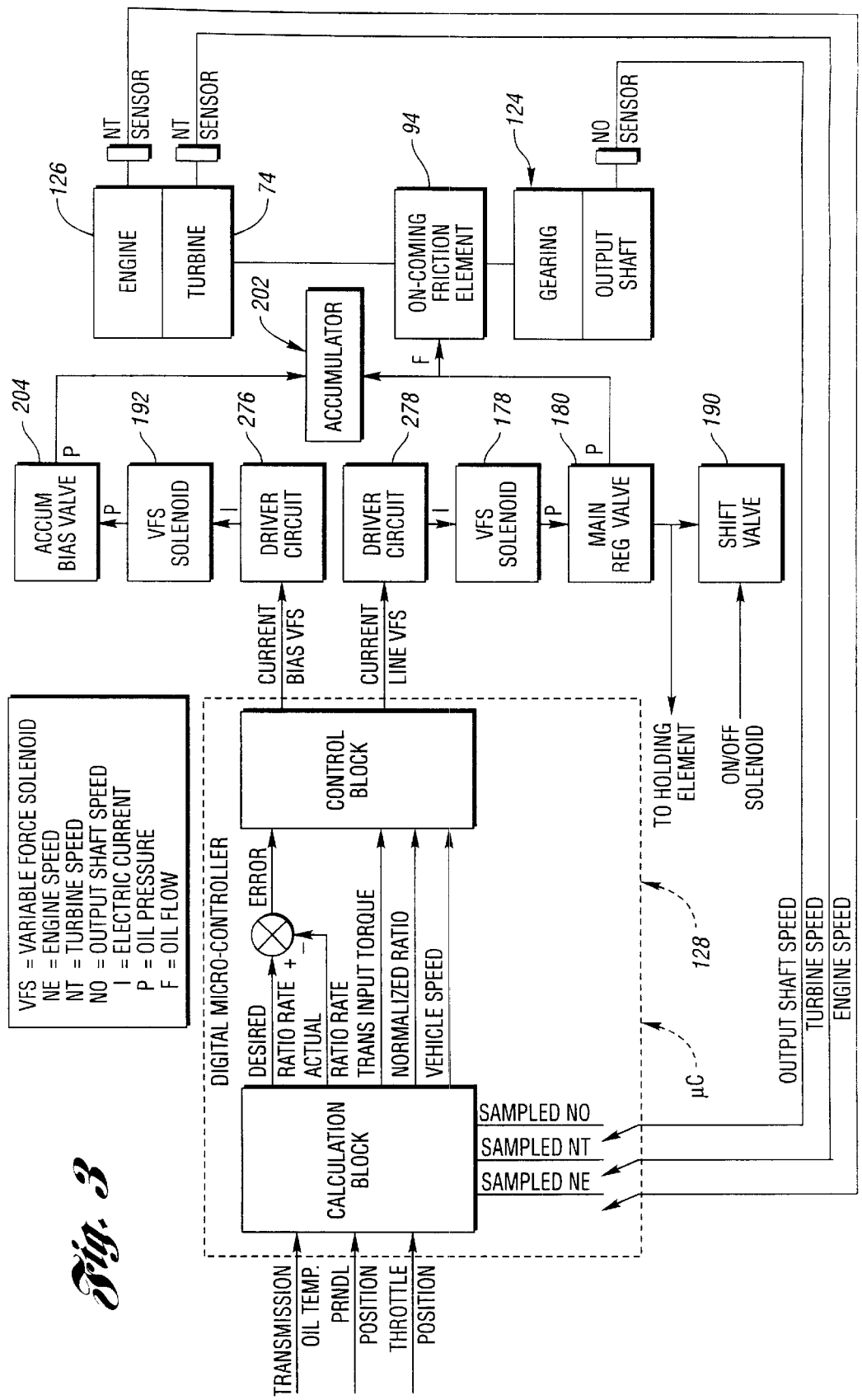
FIG. 3 is a block diagram of the digital microprocessor in combination with a control valve system for controlling an oncoming friction element during a ratio change.

For purposes of describing the adaptive control algorithm, reference now will be made to FIGS. 3 and 4. As previously mentioned, input values are read from hardware sensors in the transmission and in the engine in addition to driver-selected signals. This is indicated in action block 214 of the control strategy software routine of FIG. 4. After the reading of the sensor inputs, control parameters are derived from the sensor inputs as shown at 216 in FIG. 4. At this step, the vehicle speed is calculated as a function of the output shaft speed times a conversion constant. Also, the speed ratio across the gearset is calculated as a function of the ratio of turbine speed to output shaft speed. Further, the normalized ratio difference is determined as a fraction of the ratio change completed. The transmission input torque is determined using an engine torque map and a torque calculation by the engine computer and the converter torque ratio.

Figure 4:
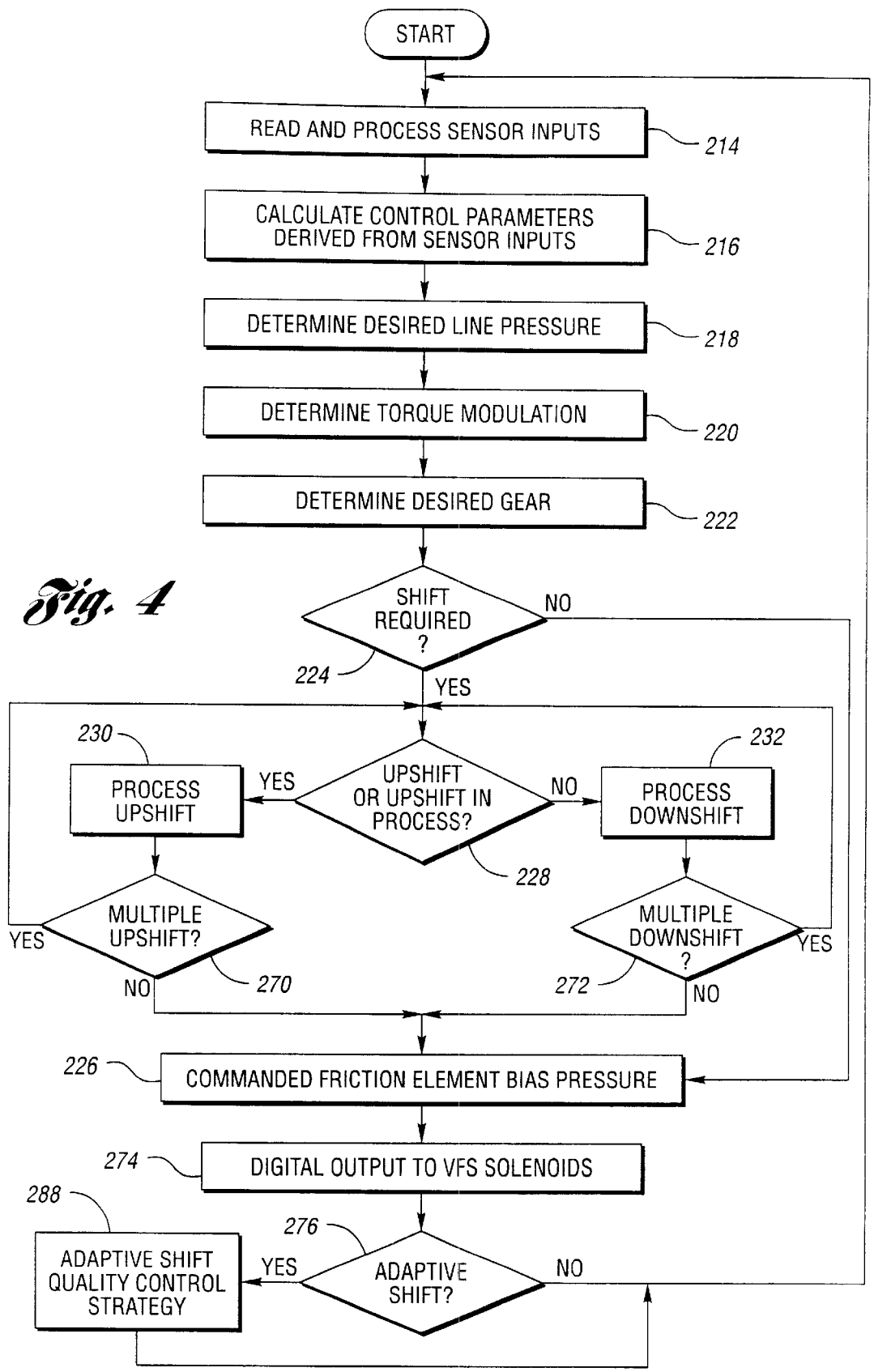
FIG. 4 is a flowchart illustrating the strategy for achieving an upshift or a downshift using the adaptive shift control strategy of the invention.

At step 218 of the routine shown in FIG. 4, the desired line pressure for a ratio change is determined as a function of the gear ratio, the transmission input torque, and the manual range selector lever position. Consideration is given also to whether the transmission is shifting or not shifting at the time the ratio change is commanded.

The line pressure must provide capacity for holding the torque at the weakest friction element. During the shift, provision then is made for raising line pressure. For upshifts, the inertia torque resulting from changing engine speed is added to the transmission input torque, and the line pressure is raised accordingly. In addition, line pressure can be boosted during the stroke phase of the piston of the friction element actuator to reduce stroke time. A transmission oil temperature signal is used to compensate for temperature in determining value of the digital output signal to the line pressure control solenoid.

In order to improve shift smoothness, provision may be made at step 220 in FIG. 4 to modulate the torque during a ratio shift. This reduces the engine torque during a ratio change by retarding the spark advance at the beginning of the shift and restoring it at the end of the shift. As a result of a transmission input torque reduction, clutch pressure can be reduced, thereby eliminating torque transients during the ratio change mode.

During a nonsynchronous downshift, the off going clutch is slipped. The engine thus accelerates to a synchronous speed, which causes a one-way clutch to engage. In the case of the friction element 94 shown in FIG. 2a, the overrunning coupling 96 becomes engaged as the friction element 94 is slipped during a 5–4 downshift.

As the engine speed approaches a synchronous speed during the downshift, torque modulation strategy is used. For example, the spark is retarded for a short interval, such as 50 ms, and then restored gradually. This reduction in engine torque slows the engine acceleration as it approaches synchronous speed, which results in a smoother one-way clutch engagement during downshifts.

At step 222 in FIG. 4, the desired gear is determined from the manual range selector lever position, the current gear ratio, the throttle position, the vehicle speed and the top gear lockout signal status (OCS).

The routine of FIG. 4 then proceeds to decision block 224, where it is determined whether a shift is required. A shift is required if the current gear is not the same as the desired gear. If no shift is required, the routine will proceed to action block 226, where the appropriate commanded bias pressure is determined. This will be described subsequently.

If a different shift between two forward driving ratios is required, a check is made during an early part of the shift interval as to whether there is a driver change of mind condition. That is, it is determined whether the current gear and the desired gear status have changed such that the shift is no longer necessary. If the change of mind condition is trues the shift is aborted and the original gear status is restored.

During each control loop of the digital controller during a shift, a commanded clutch pressure is determined and converted to an electric current to the bias accumulator variable-force solenoid 192 of FIG. 2d. This controls the pressure at the back of the oncoming friction element accumulator 202. The basic shift control strategy for shifting between forward gears will be described in detail subsequently.

After a check is made at step 228 regarding whether an upshift has been made or an upshift is in progress, and if the inquiry at 228 is positive, the upshift is processed at 230. If the inquiry is negative, a downshift is processed at 232.

The upshift logic will be described with reference to FIGS. 5a, 5b and 5c. The upshift events and the timing for a nonsynchronous upshift have three primary parts. These are the shift start level mode, the shift ratio change mode, and the shift level end mode. The shift start level mode has two phases for the oncoming friction element. These are the clutch stroke phase 234, seen in FIG. 5c, and the torque transfer phase 236, seen in FIG. 5a. Shift quality and consistency is maintained by adapting the clutch pressure for the start of the inertia phase based on the values of the parameters resulting from prior shifts. These parameters are linearly extrapolated ratio change time, the time from the start of the shift to the start of the inertia phase and the initial rate of pressure change at the friction element to achieve the desired ratio change time.

As an upshift is commanded and implemented with a change in on/off solenoid status of the shift valve circuit 190 of FIG. 2d, oil is allowed to flow into the oncoming friction element 94. First, the friction element passages are filled with oil if they are not already filled, and the friction element pressure rises to overcome the friction element return spring force on applied friction surfaces.

The friction element pressure to the oncoming friction element continues to increase until the friction element just begins to grab or to engage. With an increase in torque capacity of the oncoming friction element, the reaction torque or one-way coupling torque begins to decrease for the overrunning coupling 96 of FIG. 2b. The torque transfer phase then is started as shown at 236.

The decrease in reaction torque causes a decrease in the output torque until the reaction torque reaches zero. Output torque is the sum of the input and reaction torque. This is followed by an increase in output torque, which is limited only by the torque capacity of the oncoming friction element 94. When enough torque has been transferred to clutch 94 to decrease the speed ratio below the previous gear ratio by a tolerance shown at 238 in FIG. 5b, the shift start mode ends.

During the shift ratio change mode for upshifts, the oncoming friction element accumulator 202 is stroked while the speed ratio of the transmission changes toward the next gear ratio. As the speed ratio continues to change, a feedback control system monitors the speed ratio change and detects any deviation from the desired ratio change rate curve. The control system then updates the clutch pressure accordingly to correct any ratio rate error. In this manner, the clutch pressure is fine-turned to maintain the optimum desired ratio change rate. This mode continues until the speed ratio across the transmission approaches the ratio of the next gear, shown at 240 in FIG. 5b.

As the shift nears completion and the speed ratio approaches its final value, a shaping function is used, as shown at 242 in FIG. 5c, to gradually reduce the ratio change rate, which results in a smooth torque transition at the end of the shift.

The shift end level mode 244, shown in FIG. 5b, finishes the application of the oncoming friction element at the beginning of this mode. The oncoming friction element then transmits most of the torque to the traction wheels. During this mode, pressure to the oncoming friction element is increased parabolically, as shown at 246 in FIG. 5c, in order to engage the clutch fully without causing an inertia torque transient or a torque "bump". This mode ends when the oncoming clutch pressure reaches maximum pressure, as shown at 248 in FIG. 5c.

Multiple upshifts can be accommodated during the ratio change mode. At a certain calibratable speed ratio, a decision is made regarding whether any further ratio change is required in the same direction and beyond the ratio for the new gear. This decision involves ending the current shift calculated earlier. For continuing shifting further in the same direction, the logic for continuing the shift, which is executed only once in the ratio change mode, invokes a transition mode where the clutch pressure is adjusted for a multiple shift. Subsequently, the strategy returns to the shift start level mode for execution of the multiple shift.

Figure 6A:
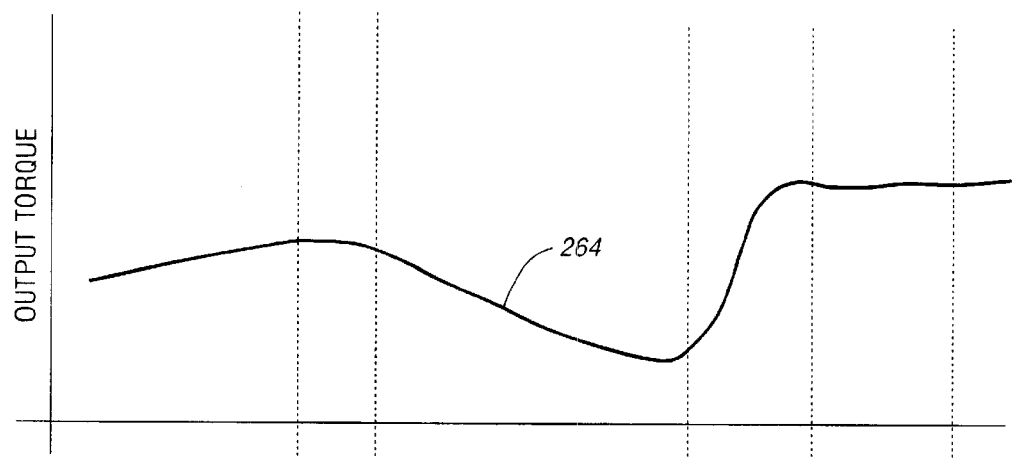
FIG. 6a is a plot of the output torque during a shift interval as the transmission is downshifted.
Figure 6B:
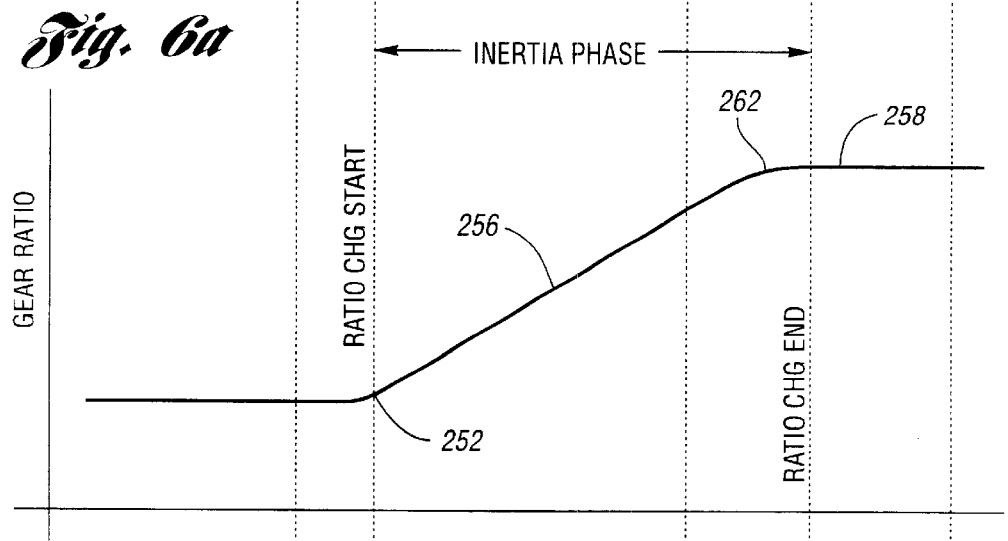
Figure 6C:
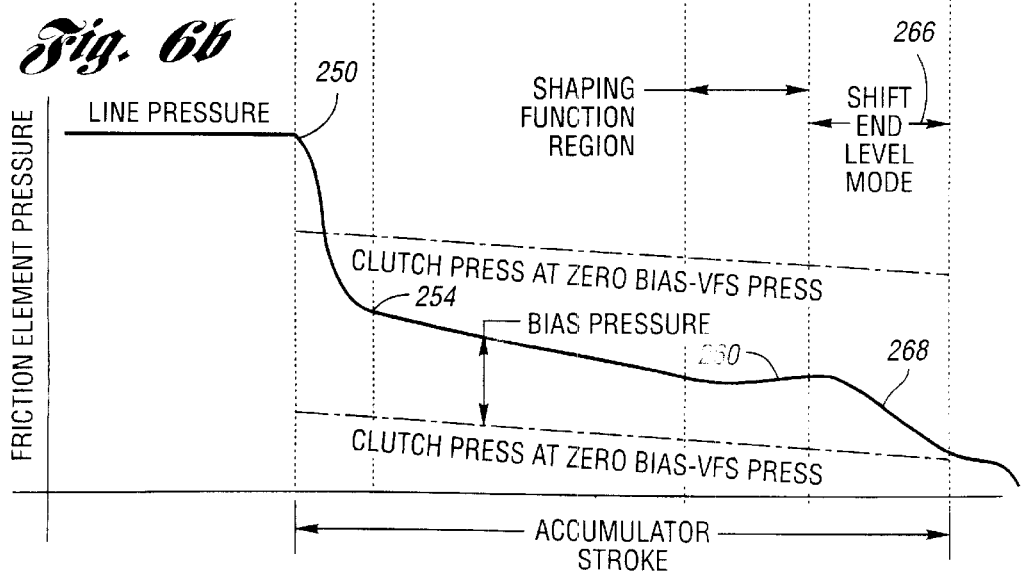
FIG. 6c is a plot of the clutch pressure during a shift interval corresponding to the downshift in FIGS. 6a and 6b.

A nonsynchronous downshift involves the events and timing illustrated in FIGS. 6a, 6b and 6c. The three parts of a nonsynchronous downshift are the shift start level mode, the shift ratio change mode for downshifts, and the shift end level mode. During the shift start level mode, the capacity of the off going friction element is reduced from full capacity to a capacity with a safety factor above the capacity necessary to keep the engine from flaring. The speed ratio stays at the previous gear ratio. The speed ratio begins to change when the static capacity of the clutch has been reduced to the level carried by the clutch.

The reduction in friction element pressure begins at 250 in FIG. 6c. The speed ratio begins to change, as shown at 252 in FIG. 6b, when static capacity of the friction element is reduced to the level carried by the friction element, as shown at 254 in FIG. 6c. The shift start level mode ends when the speed ratio increases by a specified amount which demonstrates that the off going friction element has begun to slip.

During the shift ratio change mode for downshifts, the offgoing clutch slip increases, as shown at 256 in FIG. 6b, which changes the speed ratio across the gearing. As in the case of the upshift, when the speed ratio continues to change during a downshift, a feedback control system monitors the speed ratio change rate and detects any deviation from the desired ratio change rate curve. The offgoing clutch pressure is adjusted accordingly.

As the downshift nears completion and the speed ratio reaches its final value at 258 in FIG. 6b, a shaping function is used to gradually reduce the ratio change rate resulting in a smooth torque transition at the end of the shift. This shaping function is shown at 260 in FIG. 6c, where the friction element pressure is gradually increased to smooth the transition that occurs at 262 in FIG. 6b.

FIG. 6a shows at 264 the progressively decreasing output torque that results from the gear ratio change at 256 due to slipping of the friction element during a nonsynchronous downshift.

The shift end level mode for downshifts completes the job of releasing the offgoing friction element, as shown at 266. The offgoing friction element slip is sufficient to allow the speed ratio to approach the next gear ratio. The oncoming overrunning coupling at that time carries most of the torque. The offgoing friction element pressure is decreased parabolically at 268 until it reaches zero as the offgoing friction element is disengaged. Since the offgoing friction element no longer transmits torque, bumps or inertia torque transitions will not be felt with remaining decreases in pressure. The shift end level mode is completed when the commanded pressure reaches zero.

In the flowchart of FIG. 4, the previously described process for determining whether a multiple upshift is required is carried out at 270. A corresponding decision regarding multiple downshifts occurs at 272 in the flowchart of FIG. 4.

Commanded friction element bias pressure is calculated at step 226 in the flowchart of FIG. 4. This bias pressure is necessary to modify the commanded clutch pressure to account for the combined effect of temperature variations on the transmission fluid, the hydraulic components and solenoid operation to provide consistent shift and engagement quality throughout the working temperature range.

The commanded clutch pressure is compensated for temperature based on the transmission oil temperature signal.

The accumulator bias pressure is subtracted from the commanded friction element pressure to obtain a commanded bias pressure. This value is then converted to the commanded VFS pressure for VFS valve 192 and is clipped between the maximum limit based on line pressure and the accumulator spring force and a calibratable minimum limit. The VFS pressure is converted into counts (representing percent current), which is a digital output of the strategy shown at 274 in the flowchart of FIG. 4. The digital output counts of the strategy are inputs to electronic driver circuits 276 and 278 in FIG. 3.

The driver circuits provide the electrical current output, which drive the two VFS solenoids, one solenoid being the VFS solenoid for the line pressure control 178, and the other solenoid being shown at 192 in FIG. 2d. Solenoid 192 controls the accumulator bias pressure.

It is determined at step 276 in FIG. 4 whether an adaptive shift strategy should be carried out to maintain consistent shift quality, thereby accommodating unit-to-unit variations and system dynamic changes throughout the life of the transmission. Shift quality is maintained by adapting initial clutch pressure to be commanded at the start of the inertia phase, as seen at 278 in FIG. 5c. This adaptation is based on linearly extrapolated ratio change time, which is the time from the start of the shift to the start of the ratio change mode, as indicated at 280 in FIG. 7a, and on the initial rate of pressure change. Delta adaptive pressure values are stored in the keep-alive memory (KAM) portion of the microcomputer for each shift to be adapted and adjusted based upon the result of previous shifts. The purpose of the adaptive control is to reduce the stroke and the torque transfer phase time, to maintain the actual ratio change rate at a value very close to the desired ratio change rate, and to minimize changes in desired friction element pressure during the ratio change mode. A detailed description of the basic shift control logic will be described with reference to FIGS. 7a and 7b.

Figure 7A:
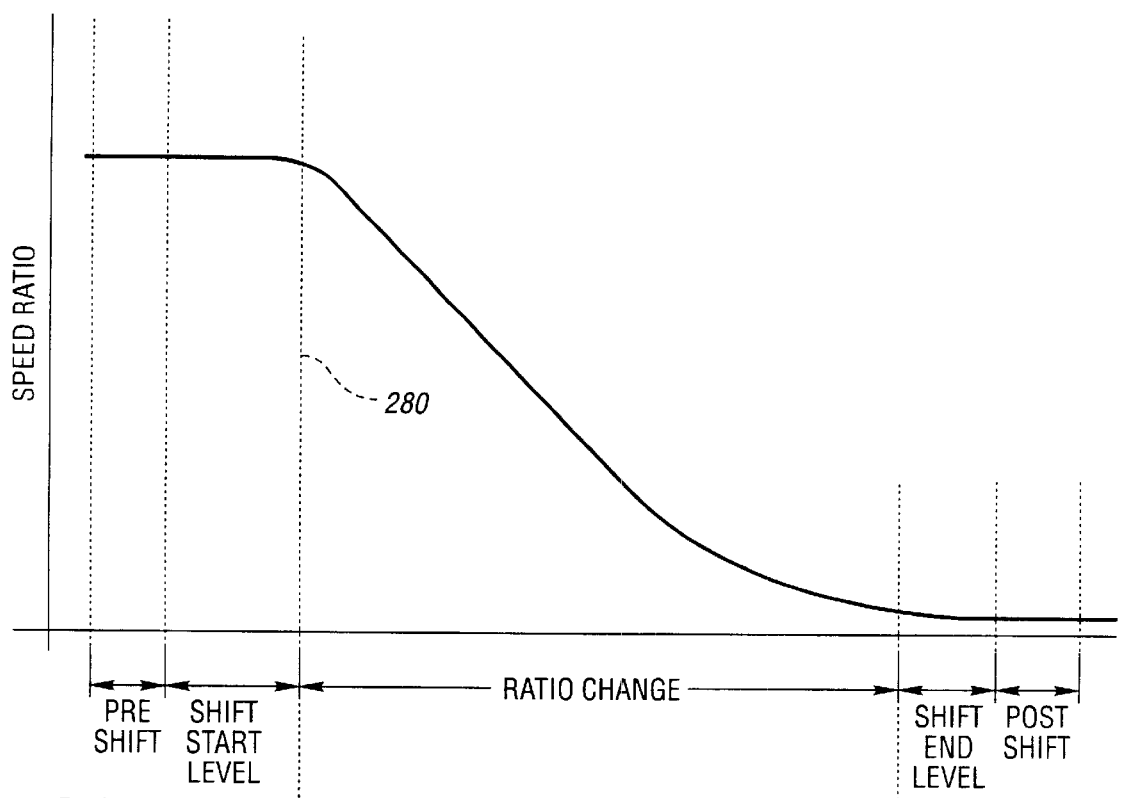
FIG. 7a is a plot of the speed ratio during a shift interval, including the various shift modes.

As seen in FIG. 7a, the shift logic is divided into five shift modes; i.e., the pre-shift mode, the shift start level mode, the ratio change mode, the shift end level mode, and the post-shift mode. Each shift mode is processed in the above order, except that the pre-shift mode may be omitted for selected shifts.

Multiple shifts occur when the desired gear has changed before the ratio change mode is completed and when further ratio change in the same direction is required. For such multiple shifts, the control logic proceeds to a transition mode from the ratio change mode, and then executes the shift start level mode, and so forth.

Figure 7B:
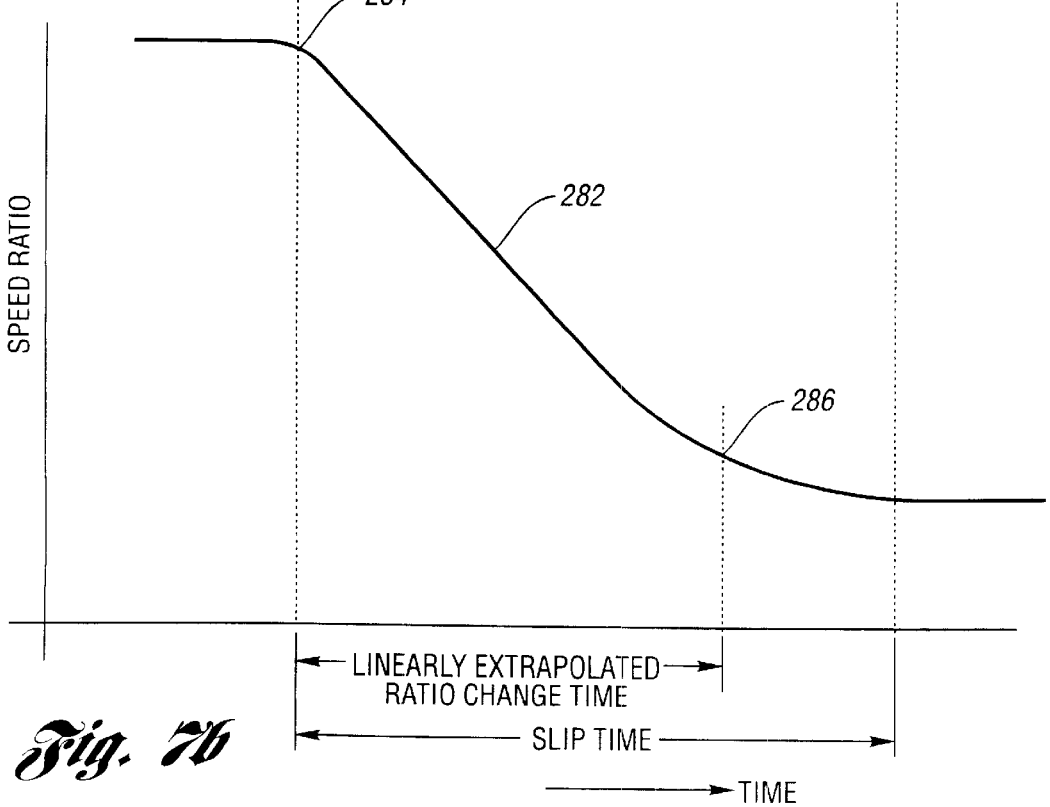

The ratio change mode indicated in FIG. 7a is linearly extrapolated to form the linear plot 282 in FIG. 7b between the slip time at 284 and the slip time at 286.

In the pre-shift mode, the friction elements are released or applied by changing the state of the shift solenoids. That is, they are either on or off. If a driver change-of-mind is detected, the pre-shift mode ends and the change-of-mind logic is executed, thereby restoring the original gear. A mode timer, if expired, indicates that the mode has ended. The mode identification and the mode timer are again loaded for the shift start level mode.

In the shift start level mode, the shift solenoids are set to the state that corresponds to the next gear. The friction element pressures for shifting are calculated based on transmission input torque as follows:

$$Pressure = \{MLTQ/GNCL*(Tq\_Trans+*Tq\_1Alpha) + PRST - (NT/1000)^2 * CCPRCF + FNPRCL + PRCL\_KAM\} * FNMLPRCLTE$$

where:

Tq_Trans is static engine torque based on throttle position and engine speed as calculated in the engine strategy.

Tq_1Alpha is dynamic torque resulting from changing engine speed.

MLTQ is a fractional multiplier based on the input torque carried by the clutch.

GNCL is a multiplier based on the clutch gain for the shift.

CCPRCF is a multiplier for converting centrifugal force to pressure.

FNPRCL is delta pressure in ROM, as a function of throttle and vehicle speed.

PRCL_KAM is delta pressure in KAM, as a function of throttle and vehicle speed.

PRST is clutch stroke pressure.

FNMLPR CLTE, which is a function of temperature, is a temperature compensation multiplier.

It is important to note that all calibrations involved in the shifts are unique for each shift. Any references to calibration names do not contain the specific shift information. This information has been deleted because it is not important to an understanding of the control logic.

A delta pressure value, which is a change in commanded clutch pressure, is determined from values learned during base calibration, during development, and then stored in the ROM portion of the memory of the microcomputer. This is added to the torque base pressure [FNPRCL(TP,VS)].

Clutch commanded pressure for the shift start mode and for the start of the ratio change mode results when an adaptive delta pressure component is added to the above base pressure value. The adaptive delta pressure is interpolated from an adaptive pressure table in keep-alive memory (KAM) [PRCL_KAM(TP, VS)].

Both the ROM (FNPRCL) and KAM (PRCL_KAM) delta pressures are found using the indices of throttle position and vehicle speed.

Delta pressure for upshifts is a function of throttle position and vehicle speed.

Delta pressure for downshifts is a function of vehicle speed and throttle position.

The pressure is clipped between the clutch stroke pressure (PRST) and line pressure resulting in the adaptive commanded clutch pressure (Pr_Cl_Cmd_Ad).

Commanded clutch pressure results when the pressure is corrected for temperature. Pr_Cl_Cmd=Pr_Cl_Cmd_ad*FNpnMLPRCLTE(temperature).

The accumulator bias pressure is obtained by subtracting from the commanded clutch pressure the calculated accumulator pressure. Pr_Bias=PR_Cl_Cmd−Pr_Acm.

At the start of the shift start level mode, the clutch accumulator pressure is initialized to the accumulator stroke pressure (PRSTAC). For upshifts, it remains constant until the ratio change mode where it is increased each loop. The increment in accumulator pressure is caused by the accumulator spring. For downshifts, it is decreased to zero by PRDLAC per loop.

The VFS pressure is obtained by subtracting the bias pressure offset PRBIOF. This bias pressure offset results from the spring load in the bias pressure control valve 204 in FIG. 2d. Pr_VFS=Pr_Bias−PRBIOF.

VFS pressure is converted to counts using FNVFCTCL (VFS pressure, temperature). The counts are then output to electronic driver circuits (counts/255=percent current) and result in electrical current to the accumulator bias VFS solenoid.

The normal end of this mode, after a minimum mode time, occurs when the speed ratio has changed toward the next gear in excess of a calibratable tolerance. At this time, the mode identification and the mode timer are loaded for the ratio change mode. The commanded clutch pressure and throttle position are saved in keep-alive memory (KAM) for use in the adaptive pressure control strategy.

If the mode timer has expired, the ratio change mode is omitted and the mode identification and the mode timer are loaded for the shift end level mode. Commanded clutch pressure becomes the shift end level mode parabolic starting pressure.

During the ratio change mode, the feedback control system will monitor the speed ratio change rate and will detect any deviation of the actual speed ratio change rate from the desired speed ratio change rate. The control system then determines the new clutch accumulator bias pressure to correct any ratio error. The clutch pressure is fine-turned in this way to maintain the optimum desired ratio change rate.

During the ratio change mode, the clutch pressure is calculated as follows:

$$Pr\_Cl\_Cmd = [Pr\_Cl\_Cmd\_Old + \Delta P(PID)*FNFRRB(Ctr\_Ramp) + FNPRCO(\Delta TP) + CCPRTF*(\Delta TQ\_TRANS)]*FNMLTE(Tempr)$$

where

FNFRRB(Ctr_Ramp)=multiplier used to reduce the gain of the PID controller for the first few loops, for smooth transition. It is a function of the number of loops from the start of the ratio change mode.

FNPRCO($\Delta$TP)=feed forward term to compensate for sudden large changes in throttle position (which are a precursor to changes of torque).

CCPRTF=constant for torque feed forward term to compensate for changes in input torque. It is activated after TMDYTQ time to allow for torque stabilization during torque modulation.

PR_CL_CMD OLD=previous loop commanded clutch pressure.

FNMLTE(tempr)=multiplier for temperature compensation.

The $\Delta P$ (PID) term is a delta pressure calculated from the PID controller as follows:

$$\Delta P(PID) = Kc*[Kp*(RTR\_ERR\_T0 - RTR\_ERR\_T1) + Ki*RTR\_ERR\_T0 + Kd*(RTR\_ERR\_T0 - 2*RTR\_ERR\_T1 + RTR\_ERR\_T2],$$

where

Kc=PID controller overall gain
Kp=PID controller proportional gain
Ki=PID controller integral gain
Kd=PID controller derivative gain
RTR_ERR commanded ratio rate−actual ratio rate
RTR_ERR_T0=control error of current loop
RTR_ERR_T1=control error of previous loop
RTR_ERR_T2=control error of two loops previous The commanded ratio rate as mentioned above is calculated as follows:

$$RTR\_CMD = [(1000/FNTMDSRC(TP)]*FNFRRC(RT\_NRM)$$

where
RTR_CMD=commanded ratio rate
FNTMDSRC(TP)=desired time in ratio change mode as a function of throttle position
FNFRRC(RT_NRM)=multiplier for shaping factor as a function of normalized ratio (value changes from 1 to 0 for an upshift).

In the above equation, the shaping factor FNFRRC results in the shaping of the ratio change mode curve in FIG. 7, as shown at 172.

Commanded clutch pressure is clipped between zero and a calculated maximum value. (The maximum pressure for the shift is based on current line pressure and the engaging clutch pressure spring offset.) To calculate the clutch bias and VFS pressures, convert the VFS pressure to counts as a function of temperature using table FNVFCTCL. (Similar to the shift start level mode.)

The normal end of this mode occurs when the speed ratio has changed to the next gear (within a tolerance SRTTLRC). If the need for a multiple shift is detected when the speed ratio is within the tolerance SRTTLSQ, the shift transition mode is entered. Otherwise, the mode identification and the mode timer are loaded for the shift end level mode. Commanded clutch pressure becomes the shift end level mode parabolic starting pressure.

The pressure change during the ratio change mode and the measured time (the calculated time for actual ratio change) are saved in keep-alive memory (KAM) for use in the adaptive pressure control strategy.

For example, during an upshift:

The pressure change is calculated as:

Delta Commanded Pressure=Commanded pressure at the start of the ratio change mode−Commanded pressure when the normalized speed ratio is less than RTNMPRUPAD (for upshift).

Measured time is the linearly extrapolated ratio change time (see FIG. 6) and is calculated as:

The expired time in the mode divided by (1−RTNMRCUPAD) at that time when the normalized speed ratio moves below the calibratable ratio (RTNMRCUPAD).

If the mode timer has expired, the mode identification and the mode timer are loaded for the shift end level mode. Commanded clutch pressure becomes the shift end level mode parabola starting pressure.

For a smooth transition to the next gear, the commanded pressure is calculated as an increasing or decreasing parabolic function (depending upon whether an upshift or a downshift is needed) based on the elapsed time in the mode.

The normal end to this mode, after a minimum time in the mode, occurs when the commanded clutch pressure rises to the maximum pressure for an upshift, or decreases to zero for a downshift, or the mode time expires. If the post shift mode time is not zero, mode identification and mode time are loaded in the mode timer for the post shift mode. (Otherwise, the shift is ended.) Post shift clutches then are applied or released, and commanded clutch pressure is set to maximum for an upshift or zero for a downshift. The normal end to this mode occurs when the mode timer expires. At this time, the shift is ended.

When the control routine indicated in the flowchart of FIG. 4 reaches step 288, the adaptive shift quality control logic is executed. For each shift included in the adaptive shift strategy, there is an adaptive pressure table maintained in the keep-alive memory portion (KAM) of the microcomputer, which contains delta pressure adjustments used for adaptive control at the start of the inertia phase of the shift. This adaptive control provides consistent shift quality throughout the life of the transmission by compensating for repeatable unit-to-unit system variations, such as a change in the coefficient of friction of the friction elements, spring loads, slow varying parameters such as friction element wear, etc.

Adapting of the pressure tables in keep-alive memory will not occur if the transmission oil temperature is too low (i.e., less than TEADSHF (~70 F)); or the throttle at the start of the ratio change mode is too low (i.e., less than TPADSHF (~5 pct)); or the throttle has changed more than TPDLADMX (~10 pct) during the ratio change mode; or the adaptive shift strategy is not enabled by software.

Shift quality consistency is achieved by adapting the clutch pressure at the start of the inertia phase based on linearly extrapolated ratio change time, indicated in FIG. 7b, the time from the start of the shift to the start of the inertia phase, and the initial rate of pressure change to achieve the desired ratio change time.

The delta pressure values stored in KAM are adjusted after each shift based on the results of previous shifts. The purpose is to optimize the torque transfer phase time, to maintain the initial actual ratio change rate at the desired ratio change rate, and to minimize changes in desired clutch pressure during the inertia phase.

During the shift, the indices used to determine the delta pressure value for adaptive control are throttle position and vehicle speed. The delta pressure value is found by interpolation of the data in the KAM table (it can be based on one cell value in the table or many cell values).

After a shift has ended, the following parameters are evaluated:

Timeout in the shift start level mode or nearly timeout (in a near-timeout window);

Delta Time=Desired−Measured time in the ratio change mode, where:

Desired time is determined as a function of throttle position for upshifts and vehicle speed for downshifts (FNTMDSRC, FNTMDSDNRC);

When the normalized speed ratio moves below the calibratable ratio (RTNMRCUPAD), measured time (for an upshift) is calculated to be equal to the expired time in the ratio change mode divided by (1-RTNMRCUPAD). A similar calculation is made for downshifts.

Delta commanded pressure change is calculated as follows: Delta commanded pressure=commanded pressure at the start of the ratio change mode−commanded pressure when the normalized speed ratio is less than RTNMPRUPAD (for upshifts—see FIG. 10a) and RTNMPRDNAD (for downshifts, see FIG. 10a). These are calibration parameters.

Figure 8:
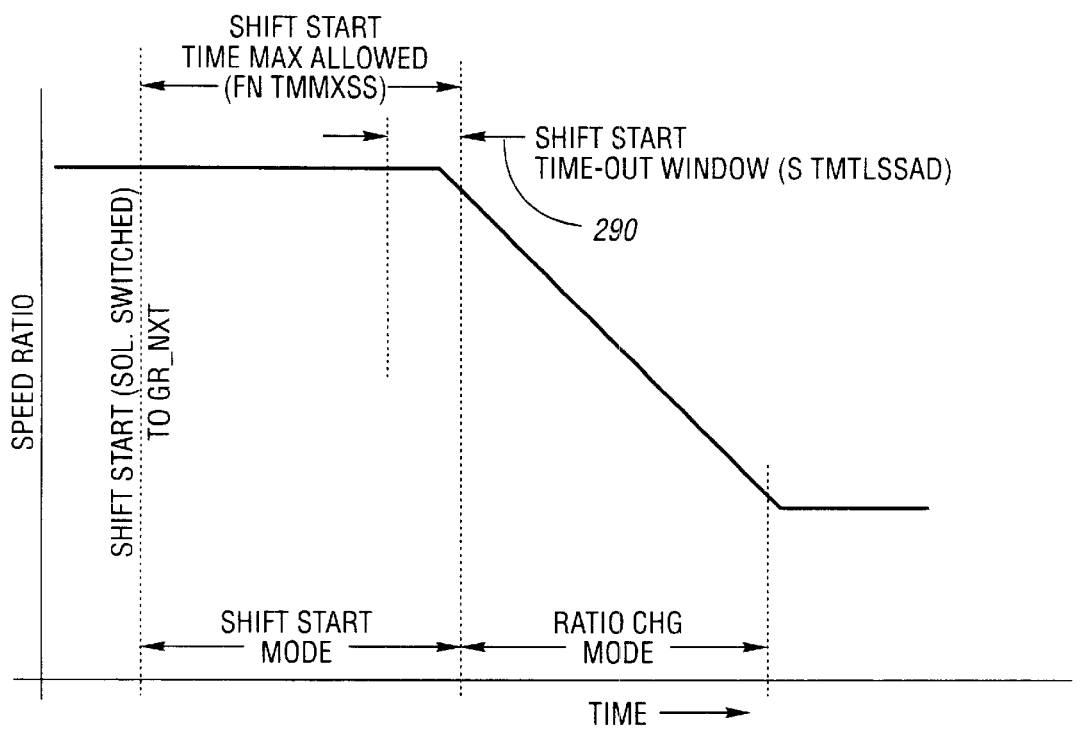
FIG. 8 is a plot of the speed ratio during a shift interval together with a shift start time-out window indicating the limits for the time allowed for the shift start mode.

The change to the adaptive delta pressure table in keep-alive memory is determined based on one of the following criteria, tested in sequence (These cases are tested and the first case that is true will result in skipping the remaining cases. Then the routine goes to the next logic block.):

CASE 1: (See FIG. 8) If the maximum time in the shift start level mode has expired, delta pressure=pressure at the start of the ratio change mode*FRPRDLUPADMX. FTPBDXUPADMX is the fraction of shift start mode adapted pressure used for maximum delta pressure change to KAM.

Figure 9A:
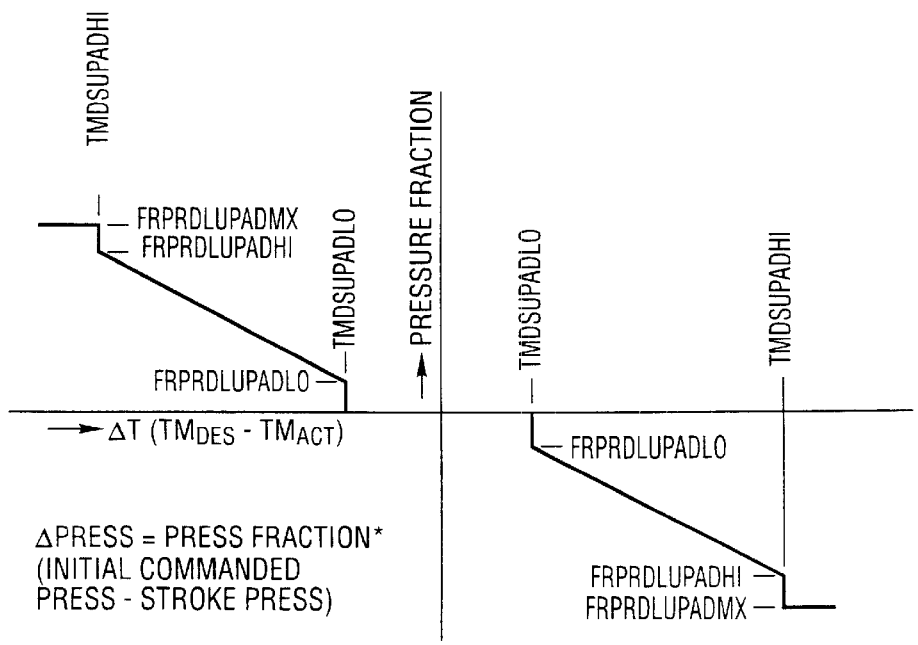
FIG. 9a is a plot of a linearly extrapolated pressure during a ratio change compared to the pressure at the start of the ratio change mode.

CASE 2: (See FIG. 9a) If Delta Time>TMDSUPADHI, delta pressure=pressure at the start of the ratio change mode*FRPRDLUPADMX. Delta pressure, which is calculated as shown in FIG. 9a, is positive when desired time exceeds measured time.

CASE 3: (See FIG. 8) If the ratio change start is within the timeout window, delta pressure=pressure at the start of the ratio change mode * FRPRDLUPADH1/2.

CASE 4: (See FIG. 9a) If Delta Time>=TMDSUPADLO and<=TMDSUPADHI, delta pressure is linearly interpolated based on delta time as shown in FIG. 9a.

CASE 5: (See FIGS. 10a and 10b) If Delta Commanded Pressure>FRPRRCADH * pressure at the start of the ratio change mode, delta pressure=pressure at the start of the ratio change mode * FRPRDLUPADLO.

CASE 6: (See FIGS. 10a and 10b) If Delta Commanded Pressure<=FRPRRCADL * pressure at the start of the ratio change mode, delta pressure=pressure at the start of the ratio change mode * FRPRDLUPADLO.

If none of these cases is true, the shift is optimum. No pressure changes are needed. The delta pressure then is set to zero.

Figure 9B:
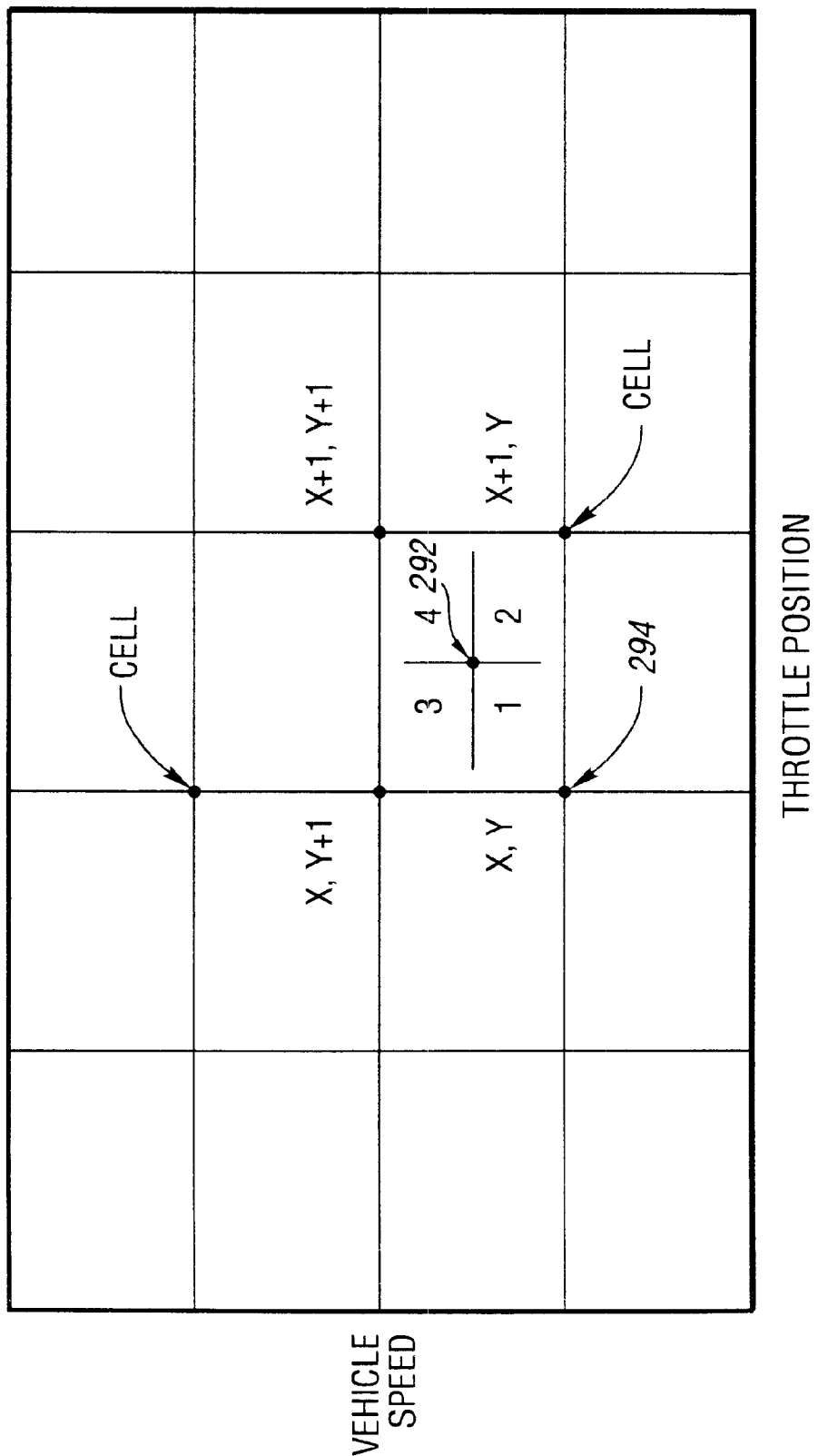
FIG. 9b is a diagram of shift point data in KAM, including coordinates of shift points at various vehicle speeds and throttle positions.

FIG. 9b is an illustration of a KAM table, which is part of the memory of the digital microcomputer.

The cell 294 in the KAM table, which is "closest" to the current shift point 292 in FIG. 9b, is considered the primary cell, while the next closest three cells are considered secondary cells. At the KAM table boundaries, there may be less than three secondary cells.

The indices of throttle position and vehicle speed are used to locate a first cell 294 in the KAM table. Further, the indices are used to point to a quadrant within this first cell. This cell, and the cells to the immediate right and above, plus a fourth cell adjacent to the cells at the right and above, define the primary and secondary cells.

The primary and secondary cells of the KAM table are adapted to new delta pressure values, as follows:

Primary Cell=Value in the cell+delta pressure.

Secondary Cells=Value in the cell+(MLPRDLUPAD * Delta Pressure). The term MLPRDLUPAD is a percent of primary cell value.

The new pressure values are clipped within maximum and minimum limits and in the cells of the KAM table.

The adaptive shift quality control logic can also be implemented for those transmission control strategies in which closed loop ratio control is not used. An adaptive control delta pressure in such a case would be added to the pressure determined by the open loop strategy, as follows:

In the open loop strategies, shift quality consistency will be maintained by adapting clutch pressure at the start of the inertia phase based on linearly extrapolated ratio change time, and the time from start of shift to start of inertia phase.

The KAM tables containing the adaptive control delta pressures would continue to be functions of throttle position and vehicle speed at the point of the shift.

While the best mode for carrying out the invention has been described in detail, those familiar with the art to which this invention relates will recognize various alternative designs and embodiments for practicing the invention. All such alternative designs and embodiments, and equivalents thereof, are defined by the following claims.

What is claimed is:

1. An adaptive control system for a multiple-ratio, nonsynchronous, geared, power transmission mechanism for an automotive vehicle powertrain having an internal combustion engine and a driven shaft connected to vehicle traction wheels, the gearing providing multiple torque flow paths of discrete speed ratios;

pressure actuated friction elements for selectively establishing and disestablishing first and second speed ratios through the gearing;

a fluid pressure source;

a control valve circuit establishing pressure distribution from the pressure source to the friction elements including shift valve means for pressurizing and exhausting an upshift friction element to effect a change from one speed ratio to a higher speed ratio;

a pressure bias accumulator in the control valve circuit between the upshift friction element and the shift valve means whereby the rate of pressure buildup in the friction element is modified to effect a smooth ratio shift;

a solenoid valve means in the control valve circuit for developing a bias pressure on the accumulator whereby the rate of pressure change at the upshift friction element is modified to establish a desired ratio change rate;

a digital microcontroller means communicating with the valve circuit for controlling the solenoid valve means, the microcontroller responding to powertrain variables to effect variable ratio change rates by controlling the accumulator bias pressure.

2. An adaptive control system for a multiple-ratio, nonsynchronous, geared, power transmission mechanism for an automotive vehicle powertrain having an internal combustion engine and a driven shaft connected to traction wheels, the gearing providing multiple torque flow paths of discrete speed ratios;

pressure-actuated friction elements for selectively establishing first and second speed ratios through the gearing, an overrunning coupling providing a reaction torque flow path during operation of the gearing in one gear ratio;

a fluid pressure source;

a control valve circuit establishing pressure distribution from the pressure source to the friction elements including a shift valve means for pressurizing and exhausting a downshift friction element to effect a change from one speed ratio to a lower speed ratio;

a pressure bias accumulator in the control valve circuit between the downshift friction element and the shift valve means whereby the rate of pressure buildup in the friction element is modified to effect a smooth ratio downshift;

a solenoid valve means in the control valve circuit for developing a bias pressure on the accumulator whereby the rate of pressure change at the downshift friction element is modified to establish a desired ratio change rate;

a digital microcontroller means communicating with the valve circuit for controlling the solenoid valve means, the microcontroller responding to powertrain variables to effect variable ratio change rates by controlling accumulator bias pressure as torque reaction on the overrunning coupling is changed in one direction and friction torque on the downshift friction element is changed in the opposite direction.

3. The adaptive control system set forth in claim 1 wherein the powertrain comprises a torque converter with a turbine connected to torque input elements of the gearing and powertrain sensors for determining powertrain variables including engine speed, turbine speed, driven shaft speed and transmission mechanism temperature;

the digital microcontroller being electronically connected to the powertrain sensors for controlling the solenoid valve means to effect optimum accumulator bias pressure to obtain optimum speed ratio change smoothness.

4. An adaptive control system for a multiple-ratio, nonsynchronous, geared, power transmission mechanism for an automotive vehicle powertrain having an internal combustion engine and a driven shaft connected to vehicle traction wheels, the gearing providing multiple torque flow paths of discrete speed ratios;

pressure actuated friction elements for selectively establishing and disestablishing first and second speed ratios through the gearing;

a fluid pressure source;

a control valve circuit establishing pressure distribution from the pressure source to the friction elements including shift valve means for pressurizing and exhausting an upshift friction element to effect a change from one speed ratio to a higher speed ratio;

a pressure bias accumulator in the control valve circuit between the upshift friction element and the shift valve means whereby the rate of pressure buildup in the friction element is modified to effect a smooth ratio shift;

a solenoid valve means in the control valve circuit for developing a bias pressure on the accumulator whereby the rate of pressure change at the upshift friction element is modified to establish a desired ratio change rate; and a digital microcontroller means communicating with the valve circuit for controlling the solenoid valve means, the microcontroller responding to powertrain variables to effect variable ratio change rates by controlling the accumulator bias pressure;

the powertrain comprising a torque converter with a turbine connected to torque input elements of the gearing and powertrain sensors for determining powertrain variables including engine speed, turbine speed, driven shaft speed and transmission mechanism temperature;

the digital microcontroller being electronically connected to the powertrain sensors for controlling the solenoid valve means to effect optimum accumulator bias pressure to obtain optimum speed ratio change smoothness;

the digital microcontroller being responsive to the powertrain variables to determine the rate of speed ratio change during a shift interval and to modify the accumulator bias pressure if the rate of change of speed ratio is different than a pre-calibrated range of ratio change rates.

5. The adaptive control system of claim 2 wherein the powertrain comprises a torque converter with a turbine connected to torque input elements of the gearing and powertrain sensors for determining powertrain variables including engine speed, turbine speed, driven shaft speed and transmission mechanism temperature;

the digital microcontroller being electronically connected to the powertrain sensors for controlling the solenoid valve means to effect optimum accumulator bias pressure to obtain optimum speed ratio change smoothness.

6. An adaptive control system for a multiple-ratio, nonsynchronous, geared, power transmission mechanism for an automotive vehicle powertrain having an internal combustion engine and a driven shaft connected to traction wheels, the gearing providing multiple torque flow paths of discrete speed ratios;

pressure-actuated friction elements for selectively establishing first and second speed ratios through the gearing, an overrunning coupling providing a reaction torque flow path during operation of the gearing in one gear ratio;

a fluid pressure source;

a control valve circuit establishing pressure distribution from the pressure source to the friction elements including a shift valve means for pressurizing and exhausting a downshift friction element to effect a change from one speed ratio to a lower speed ratio;

a pressure bias accumulator in the control valve circuit between the downshift friction element and the shift valve means whereby the rate of pressure buildup in the friction element is modified to effect a smooth ratio downshift;

a solenoid valve means in the control valve circuit for developing a bias pressure on the accumulator whereby the rate of pressure change at the downshift friction element is modified to establish a desired ratio change rate; and a digital microcontroller means communicating with the valve circuit for controlling the solenoid valve means, the microcontroller responding to powertrain variables to effect variable ratio change rates by controlling accumulator bias pressure as torque reaction on the overrunning coupling is changed in one direction and friction torque on the downshift friction element is changed in the opposite direction;

the powertrain comprising a torque converter with a turbine connected to torque input elements of the gearing and powertrain sensors for determining powertrain variables including engine speed, turbine speed, driven shaft speed and transmission mechanism temperature;

the digital microcontroller being electronically connected to the powertrain sensors for controlling the solenoid valve means to effect optimum accumulator bias pressure to obtain optimum speed ratio change smoothness;

the digital microcontroller being responsive to the powertrain variables to determine the rate of speed ratio change during a shift interval and to modify the accumulator bias pressure if the rate of change of speed ratio is different than a pre-calibrated range of ratio change rates.

7. A control strategy and method for an adaptive control system for a multiple-ratio, nonsynchronous, geared, power transmission mechanism for an automotive vehicle powertrain having a throttle-controlled internal combustion engine and a driven shaft connected to vehicle traction wheels, the gearing providing multiple torque flow paths of discrete speed ratios, the transmission mechanism having pressure actuated friction elements for selectively establishing and disestablishing first and second speed ratios through the gearing;

the control system including a control valve circuit establishing pressure distribution from a pressure source to the friction elements including shift valve means for pressurizing and exhausting an upshift friction element to effect a change from one speed ratio to a higher speed ratio, and a pressure bias accumulator in the control valve circuit between the upshift friction element and the shift valve means whereby the rate of pressure buildup in the friction element is modified to effect a smooth ratio shift;

the control strategy including the steps of measuring powertrain variables including engine speed, driven shaft speed, commanded throttle position and driver-selected ratio;

developing a bias pressure on the accumulator whereby the rate of pressure change at the upshift friction element is modified to establish a desired ratio change rate; and controlling the bias pressure in response to the powertrain variables to effect a desired ratio change rate by controlling the accumulator bias pressure.

8. A control strategy and method for an adaptive control system for a multiple-ratio, nonsynchronous, geared, power transmission mechanism for an automotive vehicle powertrain having a throttle-controlled internal combustion engine and a driven shaft connected to traction wheels, the gearing providing multiple torque flow paths of discrete speed ratios, the transmission mechanism having pressure-actuated friction elements for selectively establishing first and second speed ratios through the gearing, an overrunning coupling providing a reaction torque flow path during operation of the gearing in one gear ratio;

the control system including a control valve circuit establishing pressure distribution from a pressure source to the friction elements including a shift valve means for pressurizing and exhausting a downshift friction element to effect a downshift from one speed ratio to a lower speed ratio;

a pressure bias accumulator in the control valve circuit between the friction element and the shift valve means whereby the rate of pressure buildup in the friction element is modified to effect a smooth ratio downshift;

the control strategy including the steps of measuring powertrain variables including engine speed, driven shaft speed, commanded throttle position and driver-selected ratio;

developing a bias pressure on the accumulator whereby the rate of pressure change at the downshift friction element is modified to establish a desired ratio change rate; and controlling the bias pressure in response to the powertrain variables to effect variable ratio change rates by controlling accumulator bias pressure as torque reaction on the overrunning coupling changes in one direction and friction torque on the downshift friction element is changed in the opposite direction.

9. The control strategy and method set forth in claim 7 including the step of shaping the ratio change rate profile during an inertia phase of the upshift as the inertia phase nears completion and the ratio approaches the desired ratio during an upshift whereby a final phase of the ratio transition is smooth.

10. A control strategy and method for an adaptive control system for a multiple-ratio, nonsynchronous, geared, power transmission mechanism for an automotive vehicle powertrain having a throttle-controlled internal combustion engine and a driven shaft connected to vehicle traction wheels, the gearing providing multiple torque flow paths of discrete speed ratios, the transmission mechanism having pressure actuated friction elements for selectively establishing and disestablishing first and second speed ratios through the gearing;

the control system including a control valve circuit establishing pressure distribution from a pressure source to the friction elements including shift valve means for pressurizing and exhausting an upshift friction element to effect a change from one speed ratio to a higher speed ratio, and a pressure bias accumulator in the control valve circuit between the upshift friction element and the shift valve means whereby the rate of pressure buildup in the friction element is modified to effect a smooth ratio shift;

the control strategy including the steps of measuring powertrain variables including engine speed, driven shaft speed, commanded throttle position and driver-selected ratio;

developing a bias pressure on the accumulator whereby the rate of pressure change at the upshift friction element is modified to establish a desired ratio change rate; and controlling the bias pressure in response to the powertrain variables to effect a desired ratio change rate by controlling the accumulator bias pressure;

shaping the ratio change rate profile during an inertia phase of the upshift as the inertia phase nears completion and the ratio approaches the desired ratio during an upshift whereby a final phase of the ratio transition is smooth; and gradually increasing bias pressure at an end phase of the upshift ratio transition whereby the ratio transition is characterized by an increase in friction element pressure and an increased torque transmitting capacity.

11. The control strategy and method set forth in claim 8 including the step of shaping the ratio change rate profile as the ratio change phase nears completion to effect a smooth downshift ratio transition.

12. A control strategy and method for an adaptive control system for a multiple-ratio, nonsynchronous, geared, power transmission mechanism for an automotive vehicle powertrain having a throttle-controlled internal combustion engine and a driven shaft connected to traction wheels, the gearing providing multiple torque flow paths of discrete speed ratios, the transmission mechanism having pressure-actuated friction elements for selectively establishing first and second speed ratios through the gearing, an overrunning coupling providing a reaction torque flow path during operation of the gearing in one gear ratio;

the control system including a control valve circuit establishing pressure distribution from a pressure source to the friction elements including a shift valve means for pressurizing and exhausting a downshift friction element to effect a downshift from one speed ratio to a lower speed ratio;

a pressure bias accumulator in the control valve circuit between the friction element and the shift valve means whereby the rate of pressure buildup in the friction element is modified to effect a smooth ratio downshift;

the control strategy including the steps of measuring powertrain variables including engine speed, driven shaft speed, commanded throttle position and driver-selected ratio;

developing a bias pressure on the accumulator whereby the rate of pressure change at the downshift friction element is modified to establish a desired ratio change rate; and controlling the bias pressure in response to the powertrain variables to effect variable ratio change rates by controlling accumulator bias pressure as torque reaction on the overrunning coupling changes in one direction and friction torque on the downshift friction element is changed in the opposite direction;

shaping the ratio change rate profile as the ratio change phase nears completion to effect a smooth downshift ratio transition; and gradually decreasing the bias pressure at an end phase of the ratio transition whereby torque capacity of the friction element following completion of the downshift is reduced.

\* \* \* \* \*